US008832311B1

(12) United States Patent
Reynolds et al.

(10) Patent No.: US 8,832,311 B1
(45) Date of Patent: Sep. 9, 2014

(54) DIVERTER

(75) Inventors: James Andrew Reynolds, Reston, VA (US); Brett Burley, Reston, VA (US); Gene Ward, Reston, VA (US); Joe Kenney, Reston, VA (US); Michael Howland, Reston, VA (US); Christopher Allen Howland, Reston, VA (US); Gilbert C. Medeiros, Falls Church, VA (US); Carlos Flor, Reston, VA (US); David Gutierrez, Reston, VA (US); Philip Desch, Reston, VA (US)

(73) Assignee: Chickasaw Management Company, LLC, Reston, VA (US)

(*) Notice: Subject to any disclaimer, the term of this patent is extended or adjusted under 35 U.S.C. 154(b) by 273 days.

(21) Appl. No.: 13/134,437

(22) Filed: Aug. 4, 2011

Related U.S. Application Data

(60) Provisional application No. 61/370,948, filed on Aug. 5, 2010.

(51) Int. Cl.
*G06F 21/00* (2013.01)
*H04L 12/56* (2006.01)
*H04K 1/00* (2006.01)
*H04L 12/00* (2006.01)

(52) U.S. Cl.
USPC ........... 709/239; 709/238; 709/245; 370/351; 370/389; 370/400; 380/255; 380/59; 726/1; 726/2; 726/3; 726/11; 726/14; 726/15

(58) Field of Classification Search
None
See application file for complete search history.

(56) References Cited

U.S. PATENT DOCUMENTS

| | | | | | |
|---|---|---|---|---|---|
| 5,781,550 | A | * | 7/1998 | Templin et al. | 370/401 |
| 6,161,129 | A | * | 12/2000 | Rochkind | 709/206 |
| 7,006,436 | B1 | * | 2/2006 | Chu et al. | 370/401 |
| 7,133,404 | B1 | * | 11/2006 | Alkhatib et al. | 370/401 |
| 7,356,001 | B1 | * | 4/2008 | Jones et al. | 370/331 |
| 7,617,525 | B1 | * | 11/2009 | Moeck et al. | 726/11 |
| 8,001,590 | B1 | * | 8/2011 | Moeck et al. | 726/11 |
| 2004/0177158 | A1 | * | 9/2004 | Bauch et al. | 709/245 |
| 2010/0162378 | A1 | * | 6/2010 | Jayawardena et al. | 726/12 |

* cited by examiner

*Primary Examiner* — Bernarr Gregory
(74) *Attorney, Agent, or Firm* — Alchemy-Partners, PC

(57) ABSTRACT

A method is provided for electronically masking the geographic location of a client device in a communication network comprising the following steps: (a) mapping a communication from a first diverter node at a first location to a second diverter node at a second location, and (b) causing the communication to appear as originating from a client device at the second location when the communication is received by a destination device, wherein the second location is different from the first location. Also provided is a device that may be used to implement such a method.

13 Claims, 23 Drawing Sheets

| # | Apparent Originating Location | Phone Number |
|---|---|---|
| 1 | Location A | 111 1234567 |
| 2 | Location B | 222 1234567 |
| 3 | Location C | 333 1234567 |
| 4 | Location D | 444 1234567 |
| 5 | Location E | 555 1234567 |
| 6 | Location F | 666 1234567 |
| 7 | Location G | 777 1234567 |
| 8 | Location H | 888 1234567 |
| 9 | Location I | 999 1234567 |
| 10 | Location J | 010 1234567 |

FIG.2

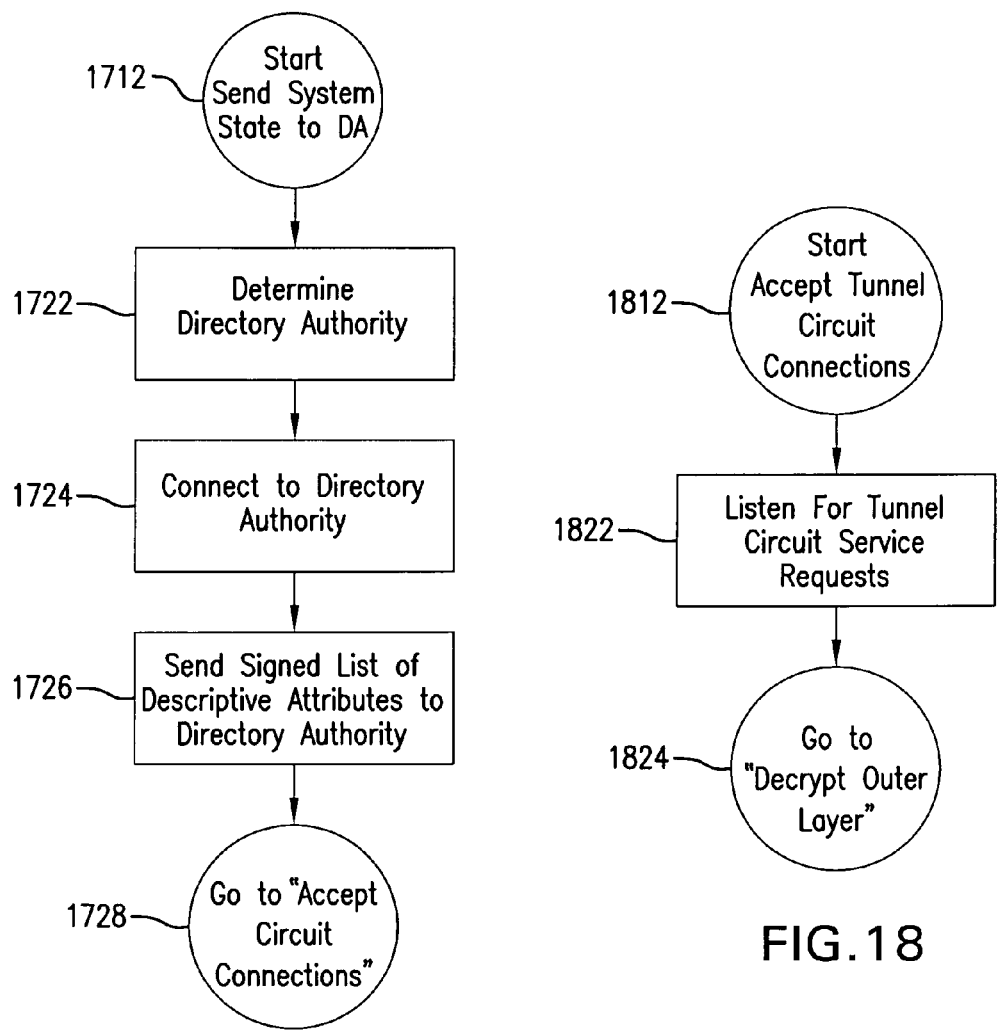

DIVERTER

CROSS-REFERENCE TO RELATED APPLICATIONS

This application claims benefit of priority to U.S. Provisional Patent Application No. 61/370,948 filed Aug. 5, 2010, entitled "ENCRYPTED VOICE OVER INTERNET PROTOCOL COMMUNICATIONS," which is incorporated herein by reference in its entirety.

BACKGROUND

1. Field of the Invention

The present invention relates generally to computer hardware and software privacy and, more particularly, to the means of electronically masking the geographic location of physical computer hardware.

2. Related Art

Today, nearly every computer has the capability to communicate over the Internet. Most commonly, the Internet is used today to allow a client at its origin to query information on a server (target). This is typically in the form of a personal computer or device accessing information on a server at another location. One of the drawbacks of Internet communication is the capability of third parties to monitor and even imitate communication between the client and server. Third parties also have the capability to discover the actual physical location of both client and server devices, a capability that may be undesirable for a user. This information can be acquired via the information sent between client and server by unauthorized users.

SUMMARY

According to a first broad aspect of the present invention, there is provided a device comprising: a first diverter comprising: a mapping module for mapping a communication from the first diverter at a first location to a second diverter at a second location, and a forwarding module for causing the communication to appear as originating from a client device at the second location when the communication is received by a destination device, wherein the second location is different from the first location.

According to a second broad aspect of the present invention, there is provided a method comprising the following steps: (a) mapping a communication from a first diverter node at a first location to a second diverter node at a second location, and (b) causing the communication to appear as originating from a client device at the second location when the communication is received by a destination device, wherein the second location is different from the first location.

BRIEF DESCRIPTION OF THE DRAWINGS

The accompanying drawings, which are incorporated herein and constitute part of this specification, illustrate exemplary embodiments of the invention and, together with the general description given above and the detailed description given below, serve to explain the features of the invention.

FIG. 2 is a table showing the possible apparent origination locations that a communication from a first user can appear to be originating from when received by a second user in accordance with one embodiment of the present invention.

FIG. 17 is a flowchart illustrating the operation of a system state module of one of the public-private transit nodes of FIG. 12.

FIG. 18 is a flowchart illustrating the operation of a circuit connection acceptance module of one of the public-private transit nodes of FIG. 12.

DETAILED DESCRIPTION OF THE PREFERRED EMBODIMENTS

Definitions

Figure 1:
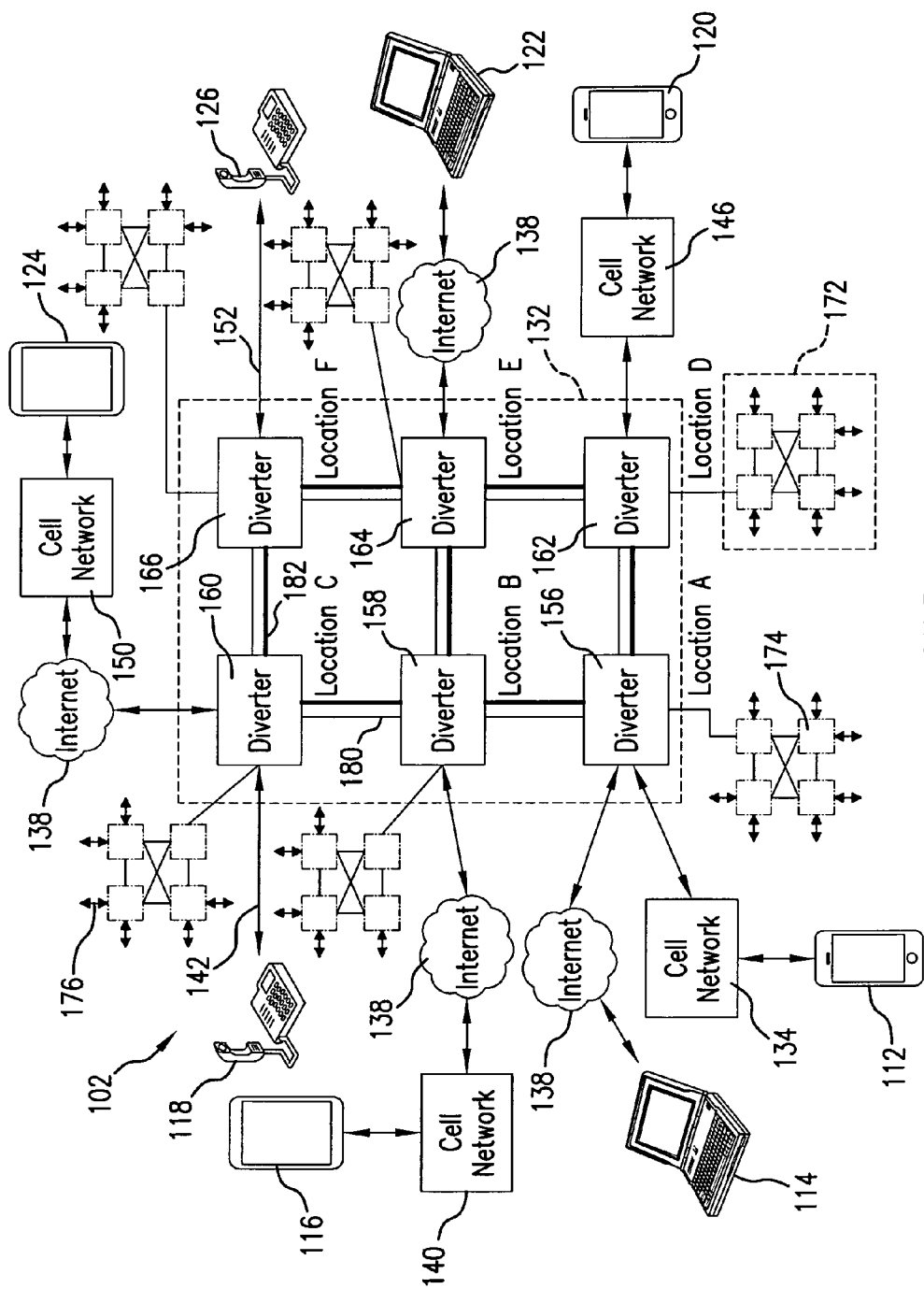
FIG. 1 is a schematic diagram of a secure geolocation obscurity network in accordance with one embodiment of the present invention.

Where the definition of terms departs from the commonly used meaning of the term, applicant intends to utilize the definitions provided below, unless specifically indicated.

For purposes of the present invention, directional terms such as "top," "bottom," "upper," "lower," "above," "below," "left," "right," "horizontal," "vertical," "upward," "downward," etc., are merely used for convenience in describing the various embodiments of the present invention.

For purposes of the present invention, the term "adversary" refers to a human who may either intentionally or unintentionally undermine the confidentiality, integrity, and/or availability of private electronic information.

For purposes of the present invention, the term "apparent originating location" refers to a location that a communication appears to be originating from when received by a destination device but which is different from the actual location from which a call originates. The apparent originating location may appear on a visual display device that is part of a destination device or that is in communication with the destination device.

For purposes of the present invention, the term "apparent originating telephone number" refers to a telephone number that a communication appears to be originating from when received by a communication device at a destination but which is different from the actual telephone number from which a communication originates. The apparent originating telephone number may appear on a visual display device that is part of a destination device a or that is in communication with the destination device.

For purposes of the present invention, the term "client," the term "client device" and the term "source" refer to the origination point, such as a communication device, of a communication circuit initiated by a client application (e.g., a web browser). A communication device that is the origination point of a communication circuit is a "client device." When an ingress node is part of a separate device that is not part of a client, the terms "client" and "client node" may be used interchangeably. However, in some embodiments of the present invention, such as that illustrated in FIG. 9, the client may include a "client node" and an "ingress node." A client may include a diverter node that may or may not include an ingress node.

For purposes of the present invention, the term "communication device" refers to electronic devices that may be used to access a data network or a communication network. Examples of communication devices include: personal computers, personal data assistants, cell phones, smartphones, laptops, tablet computers, handheld gaming devices, video game players, pagers, etc.

For purposes of the present invention, the term "data storage device" or "storage device" refers to any storage device or storage devices on which data may be stored for use by a computer system. Examples of data storage media include floppy disks, Zip™ disks, CD-ROM, CD-R, CD-RW, DVD, DVD-R, flash memory, hard disks, optical disks, etc.

For purposes of the present invention the term "destination," the term "destination device," the term "server" and the term "server device" refer to the termination point, such as a communication device, of the communication circuit initiated by a client application (e.g., a web browser). A communication device that is the destination point of a communication circuit is a "destination device." When an egress node is part of a separate device that is not part of a server, the terms "server" and "server node" may be used interchangeably. However, in some embodiments of the present invention, such as that illustrated in FIG. 9, the server may include a "server node" and an "egress node." A server may include a diverter node that may or may not include an egress node.

For purposes of the present invention, the term "diverter" and the term "diverter node" refer to a node for a network that includes a diverter module. A diverter or diverter node may include an ingress node module, an egress node module and/or a transit node module.

For purposes of the present invention, the term "diverter module" refers to hardware and/or software that include a mapping module and a forwarding module that allows a diverter to function as an ingress diverter.

For purposes of the present invention, the term "double tunnel" refers to wrapping one logically and cryptographically discrete information circuit (an "inner tunnel," also referred to as the "egress tunnel") within another logically and cryptographically discrete information circuit (the "outer tunnel," also referred to as the tunnel circuit). In the double tunnel of the present invention, there are two (2) different encryptions: (1) point-to-point (node-to-node) encryption for the outer tunnel (the tunnel circuit) and (2) end-to-end (ingress-to-egress) encryption for the inner tunnel (the egress tunnel) that is passed inside the node-to-node encryption.

For purposes of the present invention, the term "egress diverter" and "egress diverter node" refers to a diverter that includes an egress node module that allows the diverter to function as an egress node.

For purposes of the present invention, the term "egress node" refers to a node that reroutes encrypted traffic from a tunnel circuit to a server node and decrypts the encrypted traffic prior to sending the traffic to the server node. An egress node may be part of a separate device or may be part of a server including the server node.

For the purposes of the present invention, the term "egress node module" refers to hardware and/or software of a node that carry out the functions of an egress node.

For purposes of the present invention, the term "external circuit" refers to any circuit that is not propagated through the private components of this invention.

For purposes of the present invention, the term "forward-looking mechanism" refers to the ability to locally manipulate circuit path creation decisions made by remote network components.

For purposes of the present invention, the term "forwarding module" refers to hardware and/or software for causing an outbound communication from an ingress diverter node to appear to a destination device as originating from a client device having the same area code as an egress diverter node or for causing an outbound communication from an ingress diverter node to appear as originating from a telephone number chosen by the mapping module of the ingress diverter node.

For purposes of the present invention, the term "hardware and/or software" refers to functions that may be performed by digital software, digital hardware, or a combination of both digital hardware and digital software.

For purposes of the present invention, the term "hidden service" refers to a client-server application hosted within the private geo-obscured transit system (GOTS) domain and made available to authorized clients, without the need to reveal the availability of the service to unauthorized clients.

For purposes of the present invention, the term "high bandwidth" refers to the allocation of a larger portion of a shared finite aggregate bandwidth resource to one pathway in comparison to one or more low bandwidth pathways.

For purposes of the present invention, the term "ingress diverter" and "ingress diverter node" refers to a diverter that includes an ingress node module that allows the diverter to function as an ingress node.

For purposes of the present invention, the term "ingress node" refers to a node that reroutes traffic from a client node to a tunnel circuit and encrypts the traffic prior to sending the traffic to the tunnel circuit. An ingress node may be part of a separate device or may be part of a communication device.

For the purposes of the present invention, the term "ingress node module" refers to hardware and/or software of a node that carry out the functions of an ingress node.

For the purposes of the present invention, the term "location" refers to a physical or virtual point with identifying information with access to one or more modes of communication. Examples of locations include: an area code and phone number for a telephone network, a cell in a cellular network, an IP address on the Internet, a physical address such as a home, office, a colocation facility, etc.

For purposes of the present invention, the term "local mechanism" refers to logical controls of the system that exist within the local operating environment of the individual components of which the invention is composed.

For purposes of the present invention, the term "logically adjacent node" refers to the node from which a given node receives private traffic and the node to which a given node sends private traffic. A tunnel circuit of the present invention is an ordered series of logically adjacent nodes.

For purposes of the present invention, the term "low bandwidth" refers to the allocation of a smaller portion of a shared finite aggregate bandwidth resource to one or more pathways in comparison to a larger portion being allocated to a high bandwidth pathway.

For purposes of the present invention, the term "mesh network" refers to having all routing nodes connected to all other routing nodes within the same network.

For purposes of the present invention, the term "mapping module" refers to hardware and/or software for mapping an outbound communication from a first node to a second node of a network. In some embodiments of the present invention, a mapping module may be used to map an outbound communication from an ingress diverter node to an egress diverter node. In some embodiments of the present invention, the first node and the second node may have different area codes.

For purposes of the present invention, the term "mode of communication" and the term "communication link" refer to any suitable technology or device known and available in the art for communicating between two or more devices. A mode of communication may be achieved or carried out through any suitable medium, such as any wired or wireless connections as well as any protocols, including, but not limited to: the Internet; GMR (Geo-Mobile Radio); TCP/IP; MODBUS RTU, MODBUS ASCII, and MODBUS TCP; XML; Ethernet; file transfer protocol (FTP); Bluetooth®; ZigBee®; e-mail, such as SMTP; cellular modems; cellular phone networks, such as CDMA and TDMA; radio signals or remote terminal units (RTU) coupled to radio frequency transmitters; satellite transmission; SDI-12; existing telephone or communication networks or wiring; a standard public switched telephone network (PSTN); dial-up using landline or telephone; a wireless network such as Wi-Fi; a wide area network (WAN); a wireless local area network (WLAN); a local area network (LAN) or a metropolitan area network (MAN); a cable Internet connection; short message system (SMS); dial-up modem; a point-to-point link; global system for mobile communications (GSM, 3GSM), general packet radio services (GPRS), evolution-data optimized (EV-DO), enhanced data rates for GSM evolution (EDGE), digital enhanced cordless telecommunications (DECT), integrated digital enhanced network (iDEN), universal mobile telecommunications systems (UMTS) or advanced mobile phone systems (AMPS); or any other means for communicating between two or more devices known to those skilled in the art.

For purposes of the present invention, the term "network" refers to a telecommunications system used to send and receive data.

For purposes of the present invention, the term "node" refers to a node for a communication network.

For purposes of the present invention, the term "obscuring protocol" refers to an overt protocol that conceals hidden communication.

For purposes of the present invention, the term "onion router" refers to a device that employs multiple layers of encryption in order to provide confidentiality and anonymity.

For purposes of the present invention, the term "outbound rule" refers to a predefined set of decisions and logic to determine the path of a particular call.

For purposes of the present invention, the terms "private data stream" and "private internal data stream" refer to internal network communications intended to be hidden from public view.

For purposes of the present invention, the term "private ingress node" refers to an ingress node that is connected to other nodes only by private connections.

For purposes of the present invention, the term "public-private egress node" refers to an egress node that is a public-private node.

For purposes of the present invention, the term "public-private transit node" refers to a transit node that is a public-private node.

For purposes of the present invention, the terms "public data stream," "public external data stream" and "public traffic" refer to network communications originated from any public network, e.g., the Internet.

For purposes of the present invention, the term "public-private node" refers to a node including a private portion for sending and receiving secure private traffic and a public portion for sending and receiving secure public traffic. A public-private node may or may not include a throttle for adjusting the size of the public and/or private portions of the public-private node.

For purposes of the present invention, the terms "randomly relay traffic" and "randomly route traffic" refer to using methods that forward traffic through different communications paths that cannot be easily predicted.

For purposes of the present invention, the term "steganographic technique" refers to any technique or protocol that hides a concealed message in an unconcealed, overt message.

For purposes of the present invention, the term "throttle" refers to the controlled suppression of network traffic to conserve network resources.

For purposes of the present invention, the term "traffic" refers to traffic, one or more pieces of data, one or more data streams or one or more communications travelling through a network.

For purposes of the present invention, the term "traffic analysis" refers to the examination of network traffic in order to find specific information.

For purposes of the present invention, the term "traffic analysis attack" refers to examination of network traffic with an intent to obtain identifying or otherwise private information about the end user that would not be overtly available.

For purposes of the present invention, the term "traffic mixing" refers to a server node acting as a proxy for multiple random data streams from many physically distributed locations that will proxy their traffic through the server, thereby making it difficult for any person who might want to track the origin of the sender.

For purposes of the present invention, the term "traffic shaping" refers to the ability for a server node to give higher priority of throughput to selected data streams and to give lower priority of throughput to the other data streams.

For purposes of the present invention, the term "transactional data" refers to data that are transmitted from one server node to the other.

For purposes of the present invention, the term "transit node" refers to a transit node/router whose sole purpose is to route traffic through it to another transit node or an egress node using a secure communications channel (but traffic will not be egressed outside the secure communications channel).

For the purposes of the present invention, the term "transit node module" refers to hardware and/or software of a node that carry out the functions of a transit node.

For purposes of the present invention, the term "tunnel circuit" refers to an end-to-end encrypted secure connection between an ingress node, two or more transit nodes and an egress node. A tunnel circuit of the present invention is an ordered series of logically adjacent nodes.

For purposes of the present invention, the term "visual display device" or "visual display apparatus" includes any type of visual display device or apparatus such as a CRT monitor, LCD screen, LEDs, a projected display, a printer for printing out an image such as a picture and/or text, etc. A visual display device may be a part of another device such as a computer monitor, television, projector, cell phone, smartphone, laptop computer, tablet computer, handheld music and/or video player, personal data assistant (PDA), handheld game player, head mounted display, heads-up display (HUD), global positioning system (GPS) receiver, automotive navigation system, dashboard, watch, microwave oven, electronic organ, automated teller machine (ATM), etc.

DESCRIPTION

Currently, there are well-known methods and systems available that allow users to communicate over the Internet anonymously in an attempt to eliminate eavesdropping by third parties. One such system aims to protect its users against traffic analysis attacks in which volunteers operate a network of onion routers that enable anonymous outgoing connections and anonymous "hidden" services. This technology is known as Tor™ (The Onion Router).

Some known drawbacks to prior art Tor™ technology, however, are: (1) users have leakage of data from the user's computer that poses a security threat, (2) users have little control over the routers in which their traffic is being passed, (3) the possibility of security attacks on the routers and (4) the limitation to certain communication protocols that causes potential error on the users' part in staying anonymous. Given the desire of some users to be truly anonymous on the Internet, Tor™ is an impractical solution and the anonymity is not truly achieved.

The present invention overcomes the above-identified shortcomings by providing communication to third-party systems by means of obscuring the true origin of the initiating user. In one embodiment, the present invention provides a series of transit nodes to randomly relay and route communications traffic. In one embodiment of the present invention, private/secure internal data streams and public external data streams are mixed together using steganographic techniques to cover intentions of attempted anonymity. In one embodiment of the present invention, performance and availability of private streams is ensured by using a traffic shaping technique. In one embodiment of the present invention, a double tunnel technique is used to hide the true origin of a data stream, thereby enhancing the confidentiality of the data stream.

FIG. 1 shows a secure geolocation obscurity network (SGLON) 102 according to one embodiment of the present invention. FIG. 1 shows eight communication devices: smartphone 112, laptop computer 114, tablet computer 116, telephone 118, smartphone 120, laptop computer 122, tablet computer 124 and telephone 126. Although any of these eight communication devices may be client devices or destination devices, for simplicity of illustration in the description below, smartphone 112, laptop computer 114, tablet computer 116 and telephone 118 will be treated as being client devices whose location is being obscured from the other four communication devices, i.e., smartphone 120, laptop computer 122, tablet computer 124 and telephone 126, which will be treated as being destination devices. Smartphone 112 connects to a geo-obscured transit system (GOTS) 132 of SGLON 102 via a cell network 134. Laptop computer 114 connects to GOTS 132 via the Internet 138. Tablet computer 116 connects to GOTS 132 via a cell network 140 and the Internet 138. Telephone 118 connects to GOTS 132 via a landline 142. Smartphone 120 connects to GOTS 132 via a cell network 146. Laptop computer 122 connects to a geo-obscured transit system GOTS 132 via the Internet 138. Tablet computer 124 connects GOTS 132 of SGLON 102 via a cell network 150 and the Internet 138. Telephone 126 connects to GOTS 132 via a landline 152. GOTS 132 includes diverters 156, 158, 160, 162, 164 and 166 at respective locations A, B, C, D, E and F. Although for simplicity of illustration GOTS 132 is shown as having only six diverters, GOTS 132 may include any number of diverters. Diverters 156, 158, 160, 162, 164 and 166 each include a transit node module so that these six diverters each function as a private transit node and so that GOTS 132 functions as a private transit node network. Diverters 156, 158, 160, 162, 164 and 166 each include an ingress node module so that each of these six diverters may function as an ingress node. Diverters 156, 158, 160, 162, 164 and 166 each include an egress node module so that each of these six diverters may function as an egress node. GOTS 132 is embedded in and connected to public external circuits 172 (only some of which are shown in FIG. 1) consisting of public nodes 174 (shown as small boxes). Double-headed arrows 176 show that public nodes 174 are connected to additional public nodes, not shown in FIG. 1, of public external circuits 172. Public connections 180 connect diverters 156, 158, 160, 162, 164 and 166 with each other, connect diverters 156, 158, 160, 162, 164 and 166 with public nodes 174 and connect public nodes 174 with each other. For simplicity of illustration, only a few public connections 180 are shown. For example, there is public connection 180 between each of the six diverters shown and the remaining five diverters. Diverters 156, 158, 160, 162, 164 and 166 are connected with each other by private connections/attachments 182. For simplicity of illustration, only a few private connections/attachments 182 are shown. For example, there is a private connection/attachment 182 between each of the six diverters shown and the remaining five diverters. Private connections/attachments 182 are shown with thick lines to indicate high bandwidth allocation. Public connections 180 are shown with thinner lines to indicate lower bandwidth allocation.

Several examples of how SGLON 102 may be used to hide the source of a communication will be now be described. The examples described below are merely exemplary and are not limiting of the many different ways that SGLON may be used to hide the source of a communication.

One example of a communication using SGLON 102: A first user sends a communication using smartphone 112 via cell network 134 and GOTS 132 to telephone 126. To the second user at telephone 126, the communication appears to be originating at an area code associated with location F, which may or may not be the same area code associated with telephone 126. The communication travels from diverter 156 to diverter 162, then diverter 164, then diverter 166, and finally via landline 152 to telephone 126. Diverter 156 acts as an ingress node and diverter 166 acts as an egress node in the tunnel circuit carrying the communication from smartphone 112 to telephone 126. Although diverter 166 is used as the egress node for this communication, any of the other five diverters shown could be used as the egress node for this communication. Smartphone 112 may or may not have the same area code as diverter 156.

Another example of a communication using SGLON 102: A first user sends a communication using laptop computer 114 via the Internet 138 and GOTS 132 to tablet computer 124. To the second user at tablet computer 124, the communication appears to be originating at an area code associated with location C, which may or may not be the same area code associated with tablet computer 124. The communication travels from diverter 156 to diverter 164, then diverter 166, then diverter 160 and finally via the Internet 138 and cell network 150 to tablet computer 124. Although no private connection/attachment 182 or public connection 180 is shown between diverter 156 and diverter 164, there are both a private connection/attachment 182 and a public connection 180 between diverter 156 and 164. Diverter 156 acts as an ingress node and diverter 160 acts as an egress node in the tunnel circuit carrying the communication from laptop computer 114 to tablet computer 124. Although diverter 160 is used as the egress node for this communication, any of the other five diverters shown could be used as the egress node for this communication. Laptop computer 114 may or may not have the same area code as diverter 156.

Another example of a communication using SGLON 102: A first user sends a communication using tablet computer 116 via the Internet 138 and GOTS 132 to smartphone 120. To the second user at smartphone 120, the communication appears to be originating at an area code associated with location D, which may or may not be the same area code associated with smartphone 120. The communication travels from diverter 158 to diverter 164, then diverter 166, then diverter 162 and finally via cell network 146 to smartphone 120. Although no private connection/attachment 182 or public connection 180 is shown between diverter 166 and diverter 162, there are both a private connection/attachment 182 and a public connection 180 between diverter 166 and 162. Diverter 158 acts as an ingress node and diverter 162 acts as an egress node in the tunnel circuit carrying the communication from tablet computer 116 to smartphone 120. Although diverter 162 is used as the egress node for this communication, any of the other five diverters shown could be used as the egress node for this communication. Tablet computer 116 may or may not have the same area code as diverter 158.

Another example of a communication using SGLON 102: A first user sends a communication using telephone 118 via landline 142 and GOTS 132 to laptop computer 122. To the second user at laptop computer 122, the communication appears to be originating at an area code associated with location E, which may or may not be the same area code associated with laptop computer 122. The communication travels from diverter 160 to diverter 158, then diverter 156, then diverter 164 and finally via the Internet 138 to laptop 122. Although no private connection/attachment 182 or public connection 180 is shown between diverter 156 and diverter 164, there are both a private connection/attachment 182 and a public connection 180 between diverter 156 and 164. Diverter 160 acts as an ingress node and diverter 164 acts as an egress node in the tunnel circuit carrying the communication from telephone 118 to laptop 122. Although diverter 164 is used as the egress node for this communication, any of the other five diverters shown could be used as the egress node for this communication. Telephone 118 may or may not have the same area code as diverter 160.

As can be seen in the examples described above, when a user or the SGLON chooses a particular location to be an apparent originating location when received by a destination device, the user or SGLON is effectively choosing a diverter at the apparent originating location to act as an egress diverter for the communication.

In the example communications described above, high bandwidth private traffic travels in a tunnel circuit between the diverter that functions as an ingress node and the diverter that functions as an egress node. In the embodiment of the present invention shown in FIG. 1, each of the six diverters includes an ingress node module, an egress node module and a transit module to allow each of the diverters to function as an ingress node, an egress node or a transit node for a particular communication. A more detailed description of a tunnel circuit and the functioning of ingress nodes, egress nodes and transit nodes according to various embodiments of the present invention are provided below and shown in FIGS. 3, 4, 5, 6, 7, 8, 9, 10, 11, 12, 13, 14, 15, 16, 17, 18, 19, 20, 21, 22, 23 and 24.

Although only a few modes communication are shown in FIG. 1 for simplicity of illustration, an SGLON of the present invention may involve various modes of communication. For example, a communication device, either the client device or the destination device, may be in communication with the SGLON via an analog line, an SIP call, or a voice-over-Internet protocol (VOIP). Also, although for simplicity of illustration only particular communication devices in FIG. 1 are shown as connecting to the GOTS via the Internet, any type of communication device that can connect to a network via the Internet may connect to a GOTS via the Internet. In addition, the devices shown as connecting to the GOTS via the Internet in FIG. 1 may be connected to the GOTS via other modes of communication.

FIG. 2 shows an example of a menu that may appear on the user interface of a visual display device that is part of client device or is in communication with a client device and that allows a user to designate a particular apparent originating location as being the place that a communication sent by the user will appear to originate from when received by a destination communication device. For example, a user having a communication device having an area code or network location associated with a location X could use the menu shown in FIG. 2 to send a communication that appears to originate at location A, B, C, D, E, F, G, H, I or J. Although in the example shown in FIG. 2, one telephone number is shown for each of the locations A, B, C, D, E, F, G, H, I and J, there may be two or telephone numbers for each location. In this case, the telephone number to be used as the apparent originating telephone number may be chosen by the user or randomly assigned. Although telephone numbers are shown for each location in the menu of FIG. 2, in some embodiments of the present invention the menu may display a list of network locations and/or telephone numbers for each location. In another embodiment of the present invention, the menu may merely show the locations that the call may appear from, and the GOTS may determine the particular number or network location the communication will appear to originate from when the communication is received by the destination device.

Figure 3:
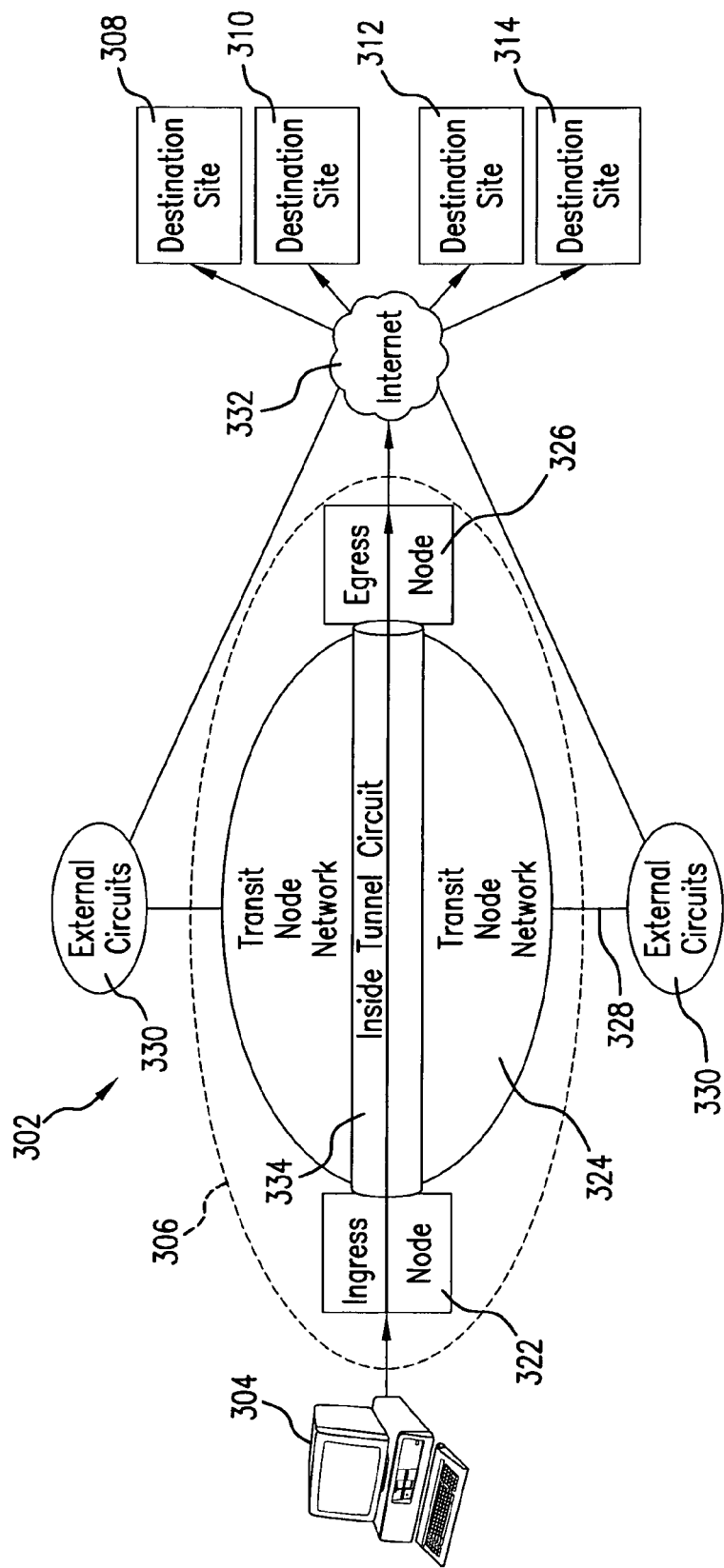
FIG. 3 is a schematic diagram of a secure geolocation obscurity network in accordance with one embodiment of the present invention.

FIG. 3 shows an SGLON 302 according to one embodiment of the present invention. SGLON includes a communication device 304, a geo-obscured transit system (GOTS) 306, and destination sites 308, 310, 312 and 314. GOTS 306 includes a private ingress node 322, a private transit node network 324 and a public-private egress node 326. Private transit node network 324 comprises public-private transit nodes that are connected to each other by high bandwidth secure connections. The public-private transit nodes of private transit node network 324 are also connected by less secure lower bandwidth connections 328 to less secure nodes in external circuits 330 that are connected to the Internet 332. A number of the public-private transit nodes of private transit node network 324 form an inside tunnel circuit 334 between private ingress node 322 and public-private egress node 326. That is, the public-private transit nodes form a secure pathway between private ingress node 322 and public-private egress node 326 that is unaffected by data/communication in external circuits 330 and between external circuits 330 and the public-private transit nodes of private transit node network 324. Communication device 304 is connected to ingress node 322. Destination sites 308, 310, 312 and 314 are connected through the Internet 332 to public-private egress node 326.

In FIG. 3, the ingress node, the egress node and/or the transit nodes may each be a diverter.

Figure 4:
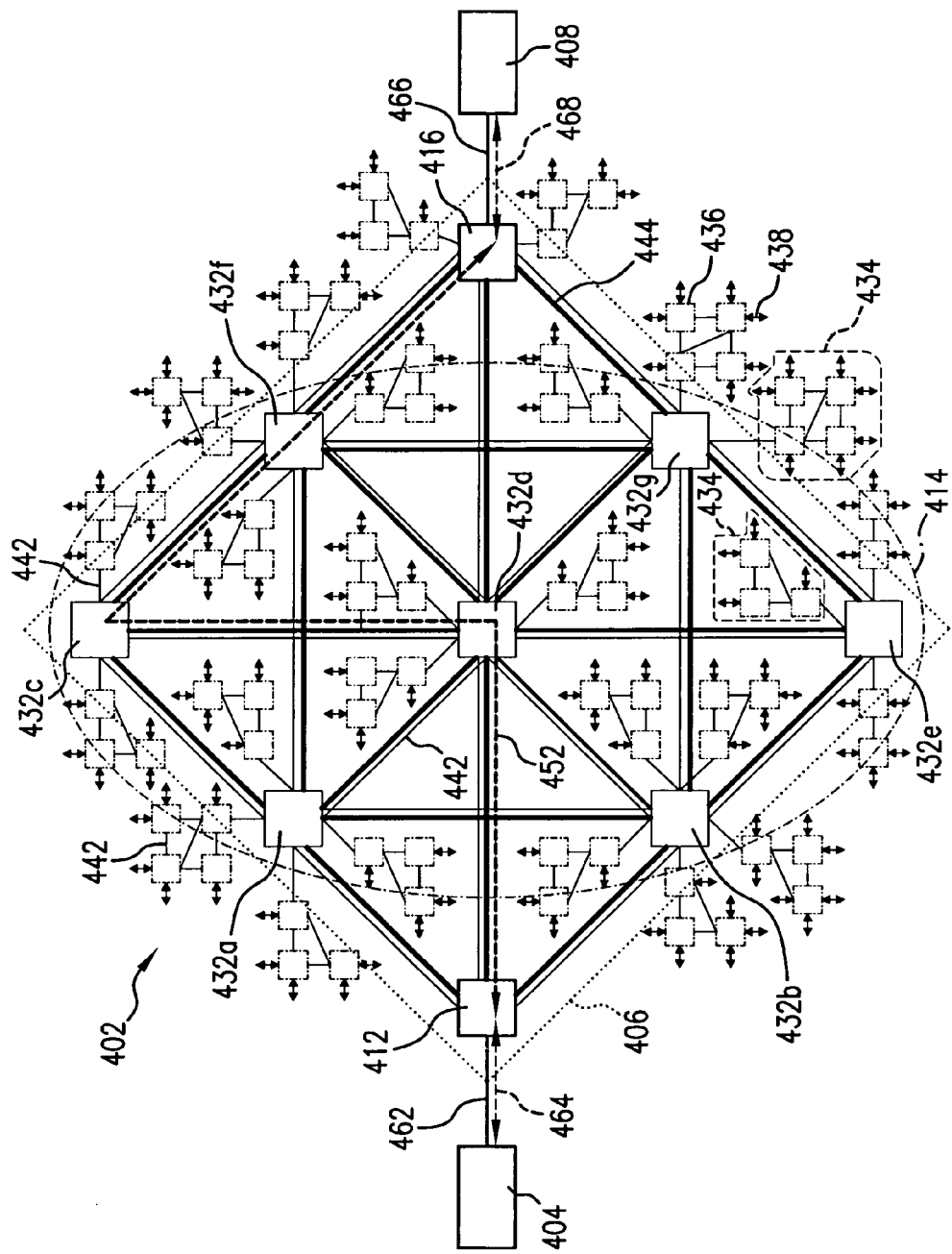
FIG. 4 is a schematic diagram of part of a secure geolocation obscurity network in accordance with one embodiment of the present invention showing an inside tunnel circuit from a source/communication device to a destination/server.

FIG. 4 shows part of an SGLON 402 according to one embodiment of the present invention. SGLON 402 includes a source/communication device 404, a GOTS 406 and a destination/server 408. GOTS 406 includes a private ingress node 412, a public-private transit node network 414 and a public-private egress node 416. Source/communication device 404 is connected to private ingress node 412. Destination/server 408 is connected to public-private egress node 416. Private transit node network 414 comprises public-private transit nodes 432a, 432b, 432c, 432d, 432e, 432f and 432g. Private transit node network 414 and public-private egress node 416 are embedded in and connected to public external circuits 434 (only some of which are shown in FIG. 4) consisting of public nodes 436 (shown as small boxes). Double-headed arrows 438 show that public nodes 436 are connected to additional public nodes, not shown in FIG. 4, of public external circuits 434. Public connections 442 connect public-private transit nodes 432a, 432b, 432c, 432d, 432e, 432f and 432g with each other, connect public-private transit nodes 432a, 432b, 432c, 432d, 432e, 432f and 432g with public nodes 436 and connect public nodes 436 with each other. Public-private transit nodes 432a, 432b, 432c, 432d, 432e, 432f and 432g are connected with each other and also with public-private egress node 416 by private connections/attachments 444. Private connections/attachments 444 are shown with thick lines to indicate high bandwidth allocation. Public connections 442 are shown with thinner lines to indicate lower bandwidth allocation. High bandwidth private traffic travels from private ingress node 412 to public-private egress node 416 in an inside tunnel circuit, shown by thick dashed arrow 452, which comprises private connections/attachments 444 between public-private transit nodes 432d, 432c and 432f. In the tunnel circuit shown by thick dashed arrow 452, public-private transit node 432d is logically adjacent to public-private transit node 432c, public-private transit node 432c is logically adjacent to public-private transit nodes 432d and 432f and public-private transit node 432f is logically adjacent to public-private transit node 432c. High bandwidth private traffic enters private ingress node 412 from source/communication device 404 over a private connection 462 as shown by thin dashed arrow 464. High bandwidth private traffic is sent by public-private egress node 416 to destination device/server 408 over a private connection 466 as shown by thin dashed arrow 468. Private traffic travels in both directions through inside tunnel circuit and over private connections 462 and 466 as shown by double-headed dashed arrows 452, 464 and 468, respectively.

For simplicity of illustration, not all of the private connections/attachments between public-private transit nodes are shown in FIG. 4. In one embodiment of the present invention, every public-private transit node of a private transit node network is securely connected/attached to every other public-private transit node in the public-private transit node network. Also, every public-private transit node may be securely connected to the private ingress node and/or the public-private egress node. For simplicity, in the discussion below, it will be assumed that all of the security transit nodes of the security transit node network are securely connected to each other and to the private ingress node and the public-private egress node. However, this may not be the case in all embodiments of the present invention.

Also, for simplicity of illustration, only a limited number of public nodes and public connections are shown in FIG. 4. For example, there may be millions or billions of public nodes in a network. Also, each public-private transit node, public-private egress node or public node may have many public connections to other nodes in the network.

In a GOTS of the present invention, such as the GOTS shown in FIG. 4, the private ingress node, the public-private transit nodes, and the public-private egress node work in concert to provide traffic mixing and traffic shaping. A successful traffic analysis attack may reveal various characteristics of networking activity that may be helpful to an adversary. Traffic mixing is employed by the GOTS to mitigate the risk of traffic analysis in those areas where GOTS traffic may be observable to an adversary. In FIG. 4, the concept of traffic mixing is illustrated by the external circuits and the inside tunnel circuit simultaneously converging on and diverging from the public-private transit nodes and the public-private egress node. The way traffic mixing is accomplished is a defining characteristic of the GOTS solution. A GOTS achieves traffic mixing by simultaneously running multiple instances of an obscuring protocol on all ingress, transit and egress nodes. Of the multiple instances of the obscuring protocol, one instance is private and used for the inside tunnel circuit and, depending on the level of traffic mixing required, one or more instances of the obscuring protocol remains available for public use. As a direct result of the GOTS traffic mixing, private, inside tunnel circuit traffic is hidden within much larger amounts of public traffic, and mitigating the risk of traffic analysis. Traffic mixing produces large volumes of network traffic, a byproduct that must be managed in order to ensure that the limited resources of the GOTS nodes, i.e., public-private transit nodes and public-private egress nodes, are always available and biased toward the inside tunnel circuit. To this end, a GOTS utilizes a technique known as traffic shaping.

The method in which a GOTS achieves traffic shaping is distinct in that it employs both forward-looking and local mechanisms. The obscuring protocol inherently accommodates forward-looking traffic shaping through parameters that are used to essentially advertise to the public the amount of bandwidth they will be allocated through the GOTS, subsequently affecting public users' circuit provisioning decisions. Local mechanisms for traffic shaping operate at the kernel-level of the operating system, allocating bandwidth to certain TCP and/or UDP services and IP addresses. Specifically, the local mechanisms are tuned to reserve the bulk of available bandwidth for the inside tunnel circuit.

One additional, important concept represented within FIG. 4 is the ability of GOTS to dynamically provision the inside tunnel circuit. Using heuristic mechanisms and various configuration parameters, a GOTS dynamic provisioning helps ensure high availability and high performance of the inside tunnel circuit. The public-private transit node network is a mesh network created by having every node attached to every other node within the GOTS environment. These attachments are created logically, not physically, across the Internet. An inside tunnel circuit is then established across these logical attachments heuristically based on node availability (i.e., online), node reliability (i.e., uptime), and performance (i.e., throughput levels) characteristics, as well as other biasing parameters that may be set manually, resulting in optimal routing of the inside tunnel circuit.

Figure 5:
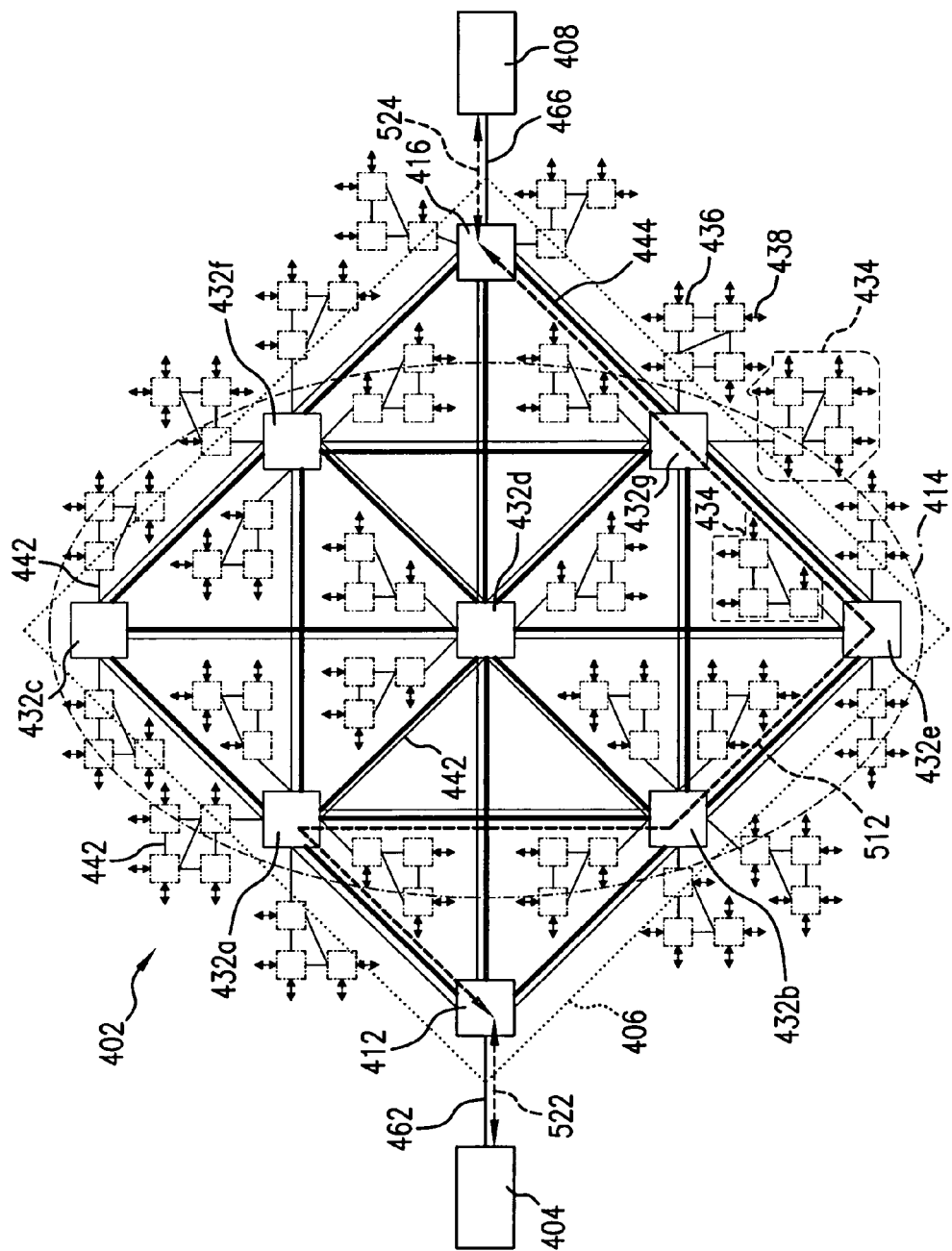
FIG. 5 a schematic diagram of part of the secure geolocation obscurity network of FIG. 4 showing an inside tunnel circuit from a destination/server to a source/client.

FIG. 5 shows one example of an inside tunnel circuit, shown by thick dashed arrow 512, for high bandwidth private traffic that travels between source/communication device 404 and destination/server 408 that passes through public-private transit nodes 432a, 432b, 432e and 432g, none of which are passed through by the inside tunnel circuit of FIG. 4. As shown in FIG. 5, the high bandwidth private traffic may travel in both directions between source/communication device 404 and destination/server 408. High bandwidth secure traffic enters private ingress node 412 from source/communication device 404 over private connection 462 as shown by thin dashed arrow 522. High bandwidth secure traffic is sent by public-private egress node 416 to destination device/server 408 over private connection 466 as shown by thin dashed arrow 524. In the tunnel circuit shown by thick dashed arrow 512, public-private transit node 432a is logically adjacent to public-private transit node 432b, public-private transit node 432b is logically adjacent to public-private transit nodes 432a and 432e, public-private transit node 432e is logically adjacent to public-private transit nodes 432b and 432g and public-private transit node 432g is logically adjacent to public-private transit node 432e.

Figure 6:
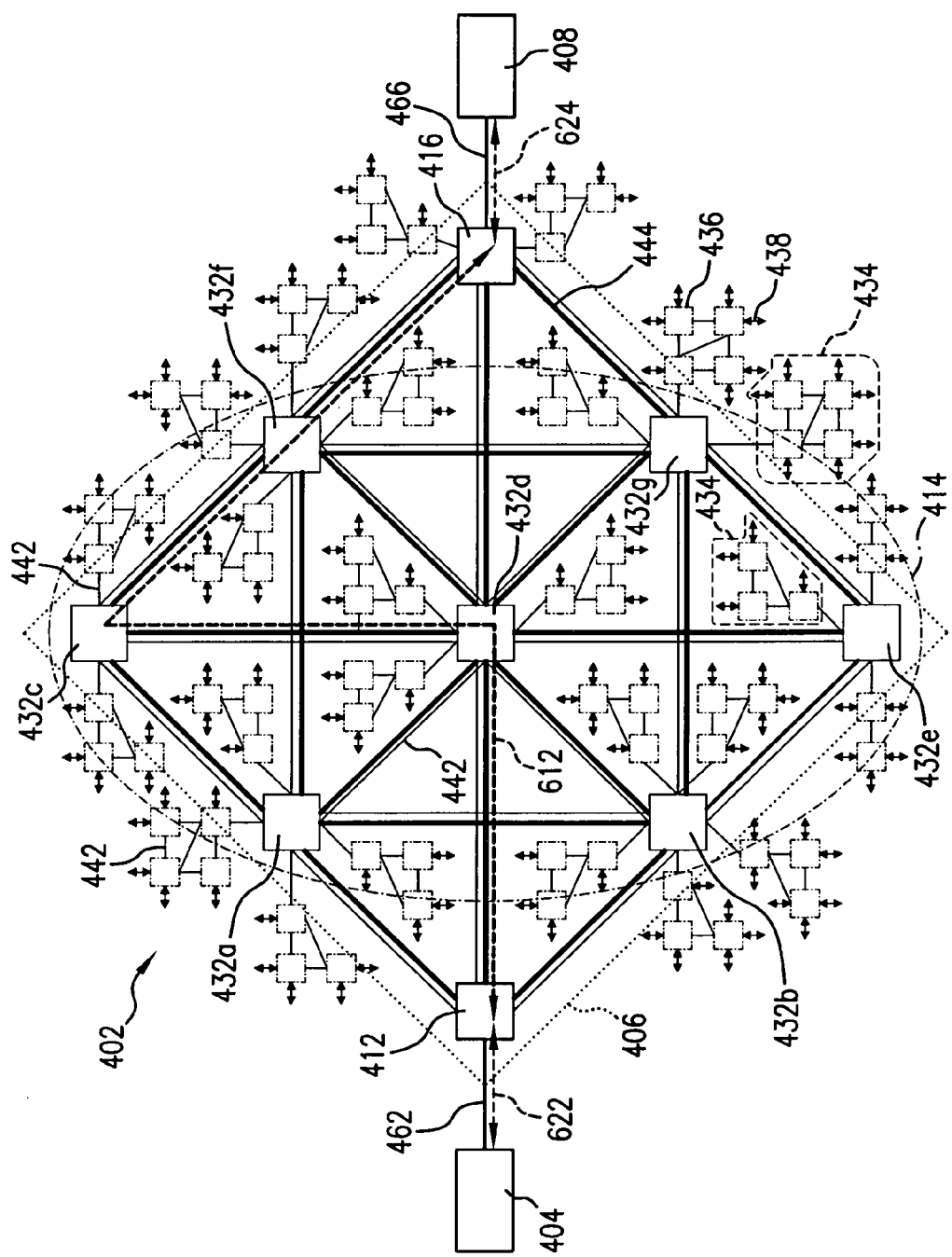
FIG. 6 is a schematic diagram of part of the secure geolocation obscurity network of FIG. 4, showing an inside tunnel circuit from a destination/server to a source/client.

FIG. 6 shows an inside tunnel circuit, shown by thick dashed arrow 612, for high bandwidth private traffic that travels between source/communication device 404 and destination/server 408 and uses some of the transit nodes (transit nodes 432d and 432f) used by the inside tunnel circuit of FIG. 4 as well as transit node 432g. As shown in FIG. 6, the high bandwidth secure traffic may travel in both directions between source/communication device 404 and destination/server 408. High bandwidth secure traffic enters private ingress node 412 from source/communication device 404 over private connection 462 as shown by thin dashed arrow 622. High bandwidth secure traffic is sent by public-private egress node 416 to destination device/server 408 over private connection 466 as shown by thin dashed arrow 624. In the tunnel circuit shown by thick dashed arrow 612, public-private transit node 432d is logically adjacent to public-private transit node 432c, public-private transit node 432c is logically adjacent to public-private transit nodes 432d and 432f and public-private transit node 432f is logically adjacent to public-private transit node 432c.

In FIGS. 4, 5 and 6 the ingress node, the egress node and/or the transit nodes may each be a diverter.

As can be seen in FIGS. 4, 5 and 6, there are many potential inside tunnel circuits for a given private transit node network from the source/communication device to the destination/server and from the destination/server to the source/communication device. There are also numerous other inside tunnel circuits that could be used in both directions between the communication device and the destination/server. In addition, because each of the public-private transit nodes is logically connected/attached to each of the other public-private transit nodes, the inside tunnel circuits are not limited by the connections shown in FIGS. 4, 5 and 6. For example, from the drawings in FIGS. 4, 5 and 6 its appears that a tunnel circuit must include a connection from public-private transit node 432d, 432f or 432g to public-private egress node 416, because only these three nodes are shown connected to public-private egress node 416. However, this is a result of illustrating only some of the logical connections between the transit nodes, egress node and ingress node for simplicity of illustration. In fact, public-private transit nodes 432a, 432b, 432c and 432e are also logically connected/attached to private ingress node 412 and public-private egress node 416. Whether two nodes that are logically connected to each other are logically adjacent to each other in a given tunnel circuit is dependent on the particular sequence of nodes in that tunnel circuit. Also, although the inside tunnel circuits of FIGS. 4, 5 and 6 are each shown operating in only one direction from the source/communication device to the destination device/server or from the destination device/server to the source communication device, each of these inside tunnel circuits could operate in either direction, depending on whether the traffic originates at the source/communication device or the destination device/server.

Figure 7:
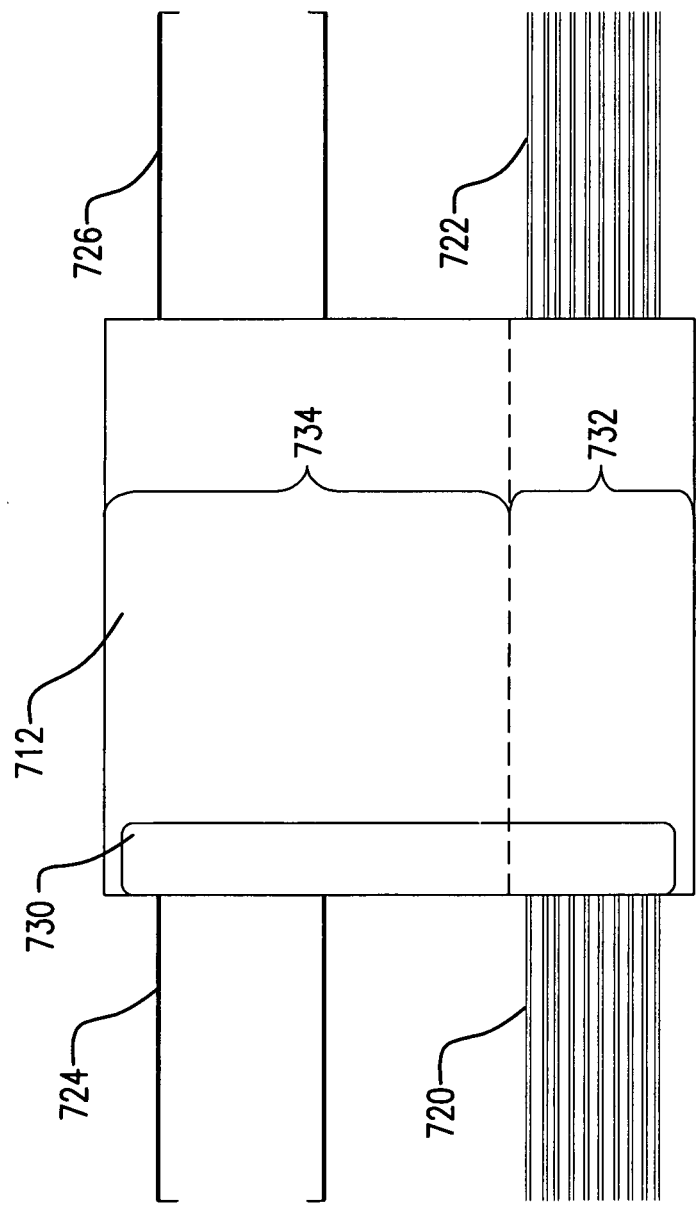
FIG. 7 is a schematic diagram of a public-private node in accordance with one embodiment of the present invention.
Figure 8:
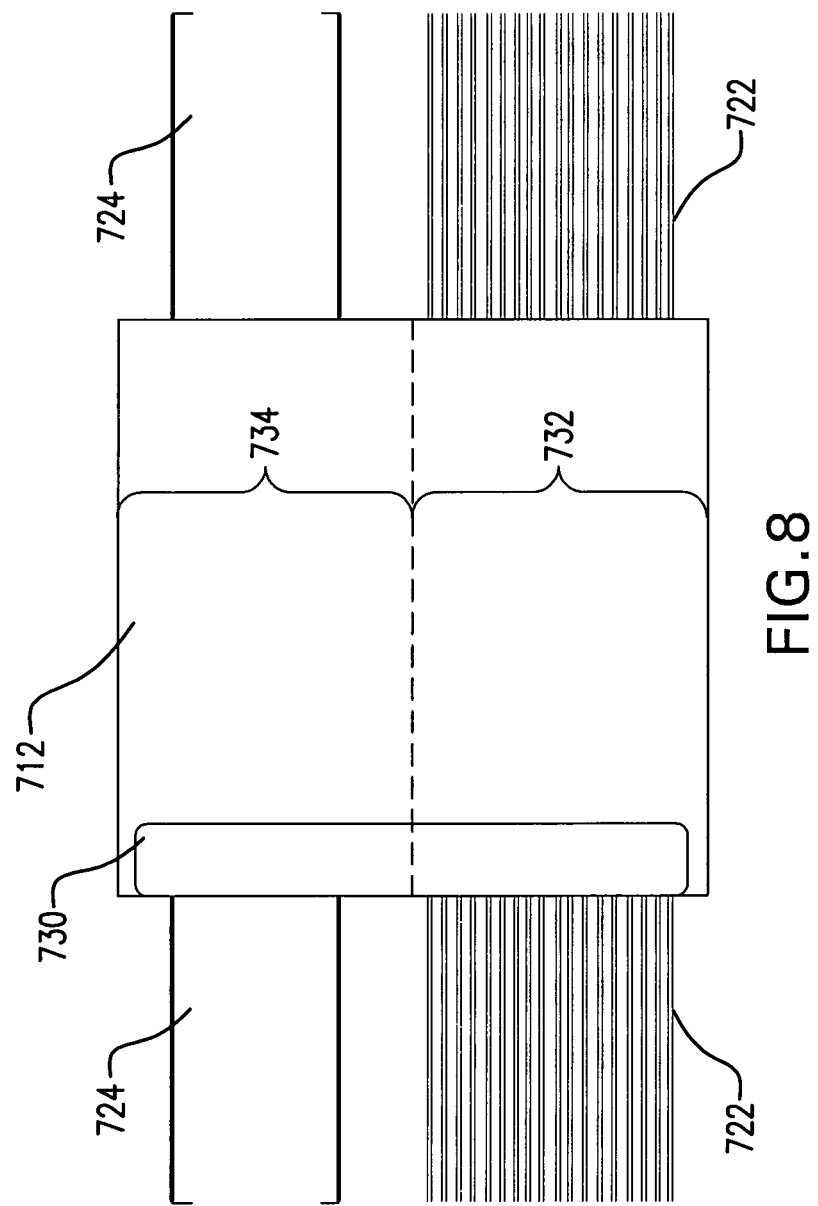
FIG. 8 is a schematic diagram of the public-private node of FIG. 7 illustrating the operation of a throttle for the node.

FIG. 7 shows a public-private node 712 according to one embodiment of the present invention. Public-private node 712 may be either a transit node or an egress node, or both simultaneously. Public-private node 712 may be a diverter. FIG. 7 includes many low-bandwidth public traffic connections 720 and 722 that connect to public-private node 712, only a small fraction of which are shown for simplicity of illustration. A combination of low-bandwidth public traffic connection 720 and low-bandwidth public traffic connection 722 form a low-bandwidth public pathway through public-private node 712 for public traffic, i.e., public traffic is received and sent by public-private node 712 using low-bandwidth public traffic connection 720 and 722. High-bandwidth private traffic connections 724 and 726 are also connected to public-private node 712. Together, high-bandwidth private traffic connections 724 and 726 provide a high-bandwidth private pathway through public-private node 712, i.e., private traffic is sent and received by public-private node 712 using private traffic connections 724 and 726. Public-private node 712 includes a throttle 730 that controls the bandwidth allotted to, and number of simultaneous connections allowed to public portion 732 of public-private node 712. Thereby, throttle 730 also controls the size of a high bandwidth private portion 734 of public-private node 712. The initial sizes of low bandwidth public portion 732 and high bandwidth private portion 734 may be set before or after public-private node 712 is connected to a private transit node network. In general, throttle 730 ensures that bandwidth allocated to private portion 734 is sufficient that private traffic may pass through public-private node 712 unimpeded. Throttle 730 may allow for additional bandwidth to be allocated to low bandwidth public portion 732, if high-bandwidth private traffic 724 and 726 pathway does not require the additional bandwidth. Such a reallocation of bandwidth is shown in FIG. 8.

Low-bandwidth public traffic interfaces 720 and 722 are each capable of being used to send and receive low-bandwidth public traffic. High-bandwidth private traffic interfaces 724 and 726 are each capable of being used to send and receive high-bandwidth private traffic.

Figure 9:
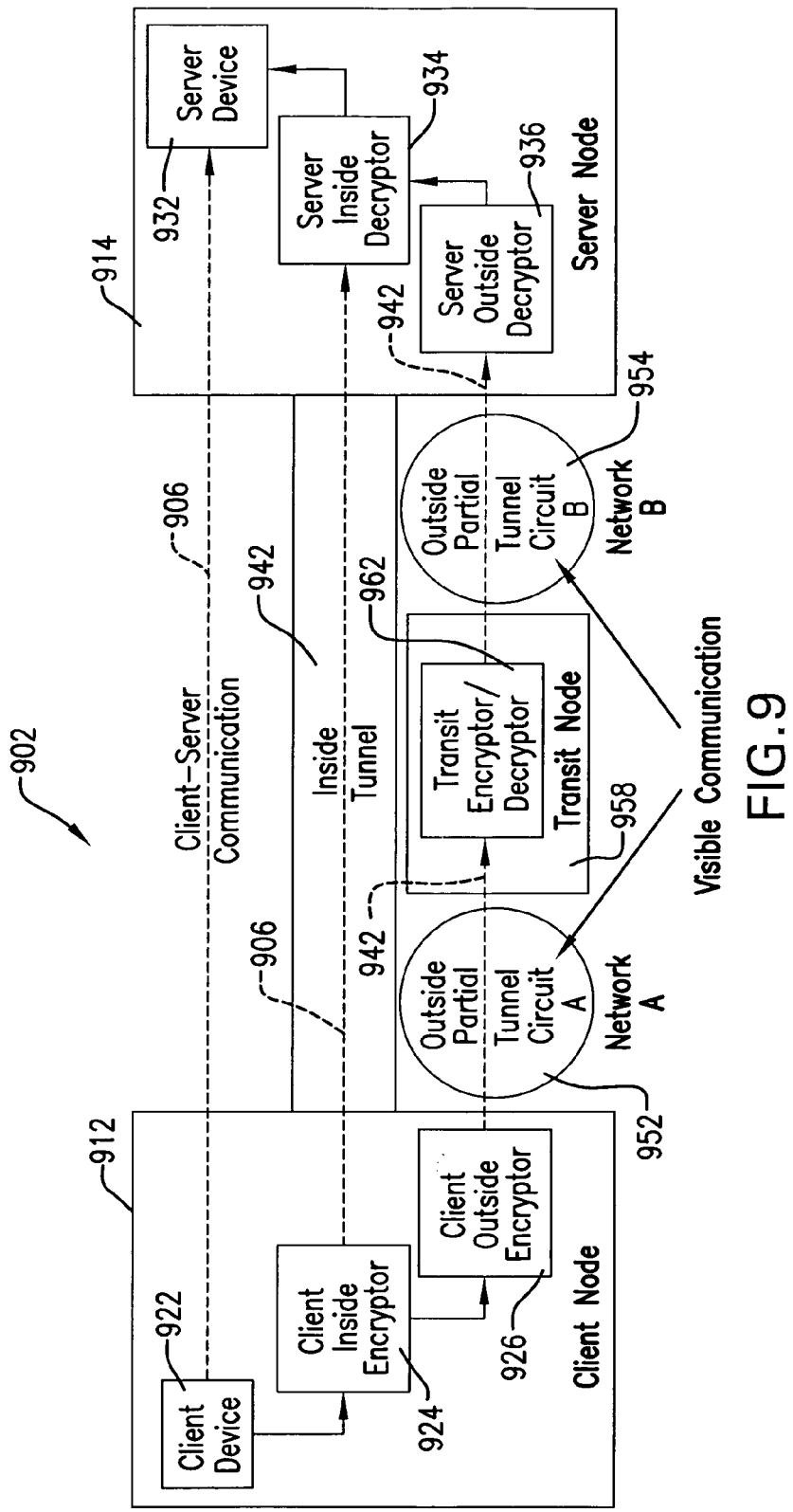
FIG. 9 is a schematic diagram illustrating how secure double tunneling works in a secure geolocation obscurity network.

The throttle of the present invention may be operated to adjust the size of the public portion of a node by limiting the number of new connections to that node and/or limiting the network resources that can be consumed by new connections. FIG. 9 shows how secure double tunneling works in a secure geolocation obscurity network, SGLON 902, according to one embodiment of the present invention. Double tunneling serves the purpose of concealing a client-server communication 906 between a client node 912 and a server node 914. Client node 912 includes a communication device 922, a client inside encryptor 924, and a client outside encryptor 926. Client inside encryptor 924 and client outside encryptor 926 are part of the ingress node for client node 912. Server node 914 includes a server device 932, a server inside decryptor 934, and a server outside decryptor 936. Server inside decryptor 932 and server outside decryptor 936 are part of the egress node for server node 914. As shown in FIG. 9, client-server communication 906 between client node 912 and server node 914 is encapsulated between client inside encryptor 924 and server inside decryptor 934 using inside tunnel 942. When a client communication from communication device 922 is received by client inside encryptor 924, client inside encryptor 924 initiates inside tunnel 942 between client inside encryptor 924 and server inside decryptor 934. Inside tunnel 942 conceals client-server communication 906 using encryption. The objective of concealing client-server communication 906 is further accomplished by encapsulating inside tunnel 942 inside an additional layer of tunneling by means of a pair of encrypted outside partial tunnel circuits 952 and 954 for two networks, Network A and Network B, respectively. As shown in FIG. 9, Network A represents the communication network between client node 912 and transit node 958, and Network B represents the separate communication network between transit node 958 and server node 914. Transit node 958 separates outside partial tunnel circuit 952 and outside partial tunnel circuit 954 in order to conceal inside tunnel 942. Inside tunnel 942 is concealed because it is encapsulated within outside partial tunnel circuits 952 and 954. Therefore, the only visible communication is between client node 912 and transit node 958, and transit node 958 and server node 914, as shown. Outside partial tunnel circuit 952 is initiated at client node 912 by client outside encryptor 926. Outside partial tunnel circuit 952 is terminated at transit node 958 by transit encryptor/decryptor module 962. Transit node encryptor/decryptor module 962 in turn initiates outside partial tunnel circuit 954 to server node 914 and server outside decryptor 936. Once outside partial tunnel circuit 954 is decrypted by server outside decryptor 936, inside tunnel 942 is in turn decrypted by server inside decryptor 934. Client-server communication from communication device 922 then arrives at server device 932 unencrypted.

Each of the modules of the secure geolocation obscurity network of FIG. 9 comprises hardware and/or software.

In some embodiments of the present invention, the client device of FIG. 9 may include an ingress diverter node that includes the client inside encryptor and the client outside encryptor. In some embodiments of the present invention, the server of FIG. 9 may include a egress diverter node that includes the client inside decryptor and the client outside decryptor.

The traffic of the present invention is hidden from public view by a "double tunnel." The first of the "tunnels" of the "double tunnel" is the "inside tunnel," i.e., the inside tunnel that defines a pathway through the public-private transit nodes. The inside tunnel may also be referred to as an "egress tunnel." The second of the tunnels is an outside tunnel or "outer tunnel" formed by the pair of outside partial tunnel circuits. In a shared network environment, the source and destination information of each outside tunnel circuit can be seen by any entity with visibility into the network. However, the inside tunnel, and accordingly the communication between the client and server, is completely encapsulated within the outside tunnel formed by the outside tunnel circuits. Because the direct connection between the client and server is not directly associated with the outside tunnel circuits, the direct connection is not attributable or visible to the outside world.

In FIG. 9 the ingress node, the egress node and/or the transit nodes may each be a diverter. Although the ingress node is shown being part of client device in FIG. 9, the ingress node may be a separate device that is connected to the client device/client node. In some embodiments of the present invention, this separate device connected to the client device/client node may be an ingress diverter. Although the egress node is shown being part of the server device in FIG. 9, the egress node may be a separate device that is connected to the server/server node. In some embodiments of the present invention, this separate device connected to the client server/server node may be an egress diverter.

Figure 10:
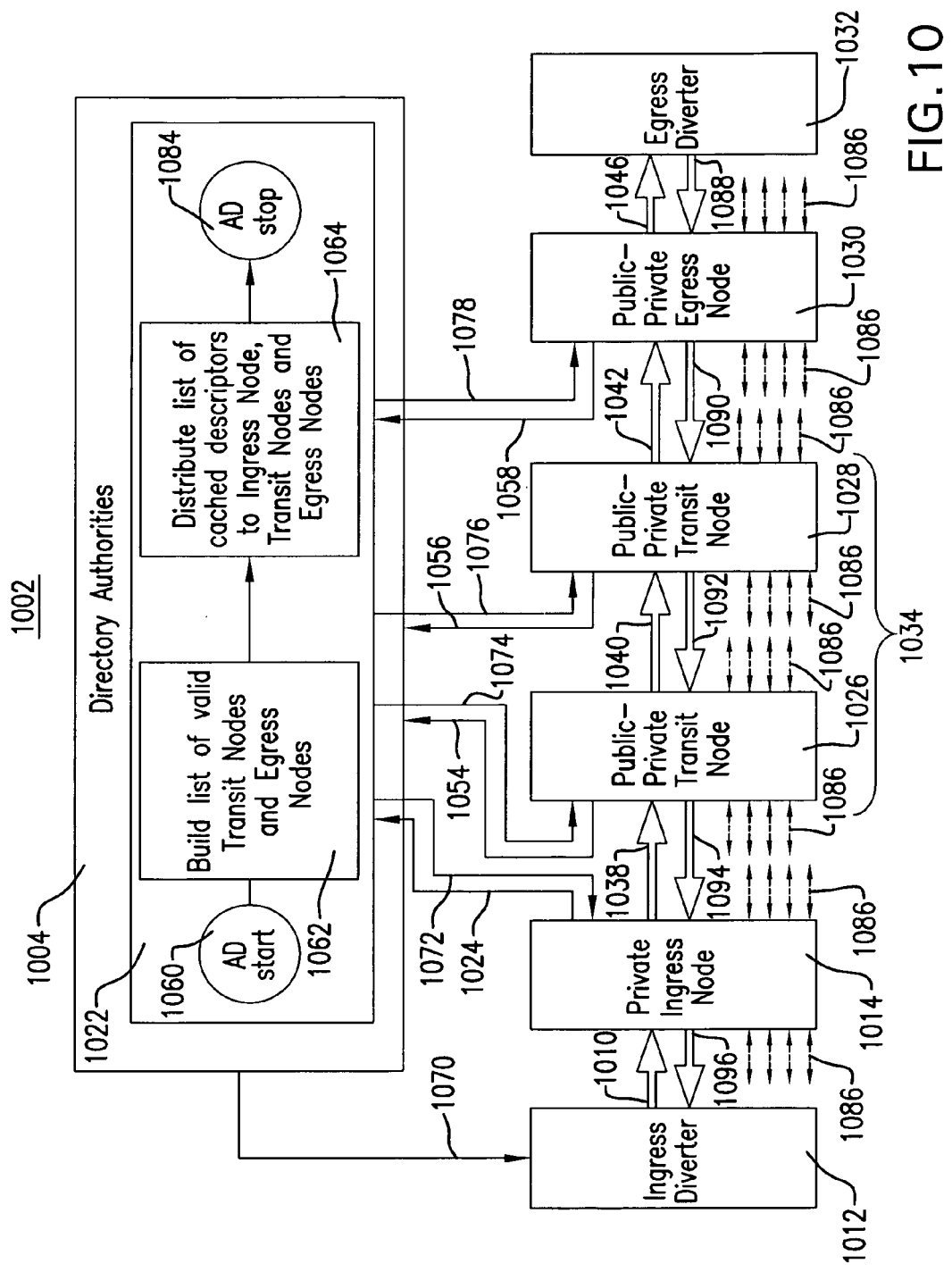
FIG. 10 is a schematic diagram illustrating end-to-end communication and data flow through a secure geolocation obscurity network in accordance with one embodiment of the present invention.

FIG. 10 shows an overview of end-to-end communication and data flow through a secure geolocation obscurity network, i.e., SGLON 1002, according to one embodiment of the present invention. SGLON 1002 includes directory authorities 1004. A client communication, indicated by arrow 1010, is received from ingress diverter 1012 by a private ingress node 1014. Although shown as being separate from private ingress node 1014 in FIG. 10, ingress diverter 1012 may be part of private ingress node 1014. Private ingress node 1014 queries a directory authority node 1022 of directory authorities 1004 with a query, as indicated by arrow 1024, to determine the valid transit nodes, i.e., public-private transit node 1026, public-private transit node 1028 and public-private egress node 1030, to use in forwarding the client communication securely to an egress diverter 1032. Public-private transit nodes 1026 and 1028 may each be diverters. Directory authority node 1022 determines the valid transit nodes and egress node, i.e., public-private transit nodes 1026 and 1028 and public-private egress node 1030, that are part of a tunnel circuit 1034 for the client communication. Once private ingress node 1014 obtains the aforementioned information from directory authority node 1022, as indicated by arrow 1036, private ingress node 1014 forms an encrypted circuit segment with a valid transit node, i.e., public-private transit node 1026, as indicated by thick arrow 1038. From public-private transit node 1026, the client communication is securely forwarded, as indicated by thick arrow 1040, to public-private transit node 1028. From public-private transit node 1028, the client communication is securely forwarded, as indicated by thick arrow 1042, to public-private egress node 1030. Upon reaching public-private egress node 1030, the communication is ultimately decrypted and forwarded, as indicated by thick arrow 1046, to egress diverter 1032. Although shown as being separate from public-private egress node 1030 in FIG. 10, egress diverter 1032 may be part of public-private egress node 1030. Before directory authority node 1022 can determine that public-private transit node 1026 and public-private transit node 1028 may be part of tunnel circuit 1034, public-private transit node 1026 and public-private transit node 1028 must introduce themselves to directory authority node 1022, as shown by arrows 1054 and 1056. Public-private egress node 1030 queries directory authority node 1022 with a query, as indicated by arrow 1058, to confirm that public-private transit node 1028, the last transit node in tunnel circuit 1034 before public-private egress node 1030, is a valid transit node.

FIG. 10 also shows the operation of directory authority node 1022. Upon receiving the queries from private ingress node 1014 and public-private egress node 1030, a list building module of directory authority node 1022 activates at step 1060 and compiles a random route path listing of valid nodes at step 1062. The random route path listing will include private ingress node 1014, public-private transit node 1026, public-private transit node 1028 and public-private egress node 1030. Also in response to these queries, directory authority node 1022 distributes cached descriptors for the random route path listing at step 1064. In FIG. 10, this distribution of cached descriptors to ingress diverter 1012, private ingress node 1014, public-private transit node 1026, public-private transit node 1028 and public-private egress node 1030 is shown by arrows 1070, 1072, 1074, 1076 and 1078, respectively. The cached descriptors distributed to ingress diverter 1012, private ingress node 1014, public-private transit node 1026, public-private transit node 1028 and public-private egress node 1030, respectively, provide only information about nodes that are logically adjacent in the tunnel circuit to the node receiving the cached descriptors. For example, the cached descriptors distributed to ingress diverter 1012 inform ingress diverter 1012 that the logically adjacent valid ingress node for the current private communication is private ingress node 1014. The cached descriptors distributed to private ingress node 1014 inform the private ingress node 1014 that the next in line logically adjacent valid node for the current communication is public-private transit node 1026. The cached descriptors distributed to public-private transit node 1026 inform public-private transit node 1028 that the previous in line logically adjacent valid node for the current communication is private ingress node 1014 and that the next in line logically adjacent valid node for the current communication is public-private transit node 1028. The cached descriptors distributed to public-private transit node 1028 inform public-private transit node that the previous in line logically adjacent valid node for the current communication is public-private transit node 1026 and that the next in line logically adjacent valid node for the current communication is public-private egress node 1030. The cached descriptors to public-private egress node 1030 inform public-private egress node 1030 that the previous in line logically adjacent valid node is public-private transit node 1028 and that the next in line logically adjacent node is egress diverter 1032.

At step 1084, directory authority node 1022 returns to a ready state until the tunnel circuit process is started again by receiving a query from an ingress node. Each of the modules of the directory authority node 1022 comprises hardware and/or software.

Public-private transit node 1026, public-private transit node 1028 and public-private egress node 1030 are also connected to public circuits, shown by double-headed arrows 1086.

Thick arrows 1088, 1090, 1092, 1094, 1096 and 1098 show secure communication from egress diverter 1032 back to ingress diverter 1012.

For simplicity of illustration, only two transit nodes are shown in FIG. 10. However, in an SGLON of the present invention, there may be many transit nodes that are part of a tunnel circuit, so that the secure communication travels through a number of public-private transit nodes between the private ingress node and a given public-private egress node.

For simplicity of illustration, only one destination/server is shown in FIG. 10. However, in a Secure Geolocation Obscurity Network of the present invention, there may be multiple destinations/servers. Therefore, the destination/server of FIG. 10 may be one of a number of destinations/servers.

Figure 11:
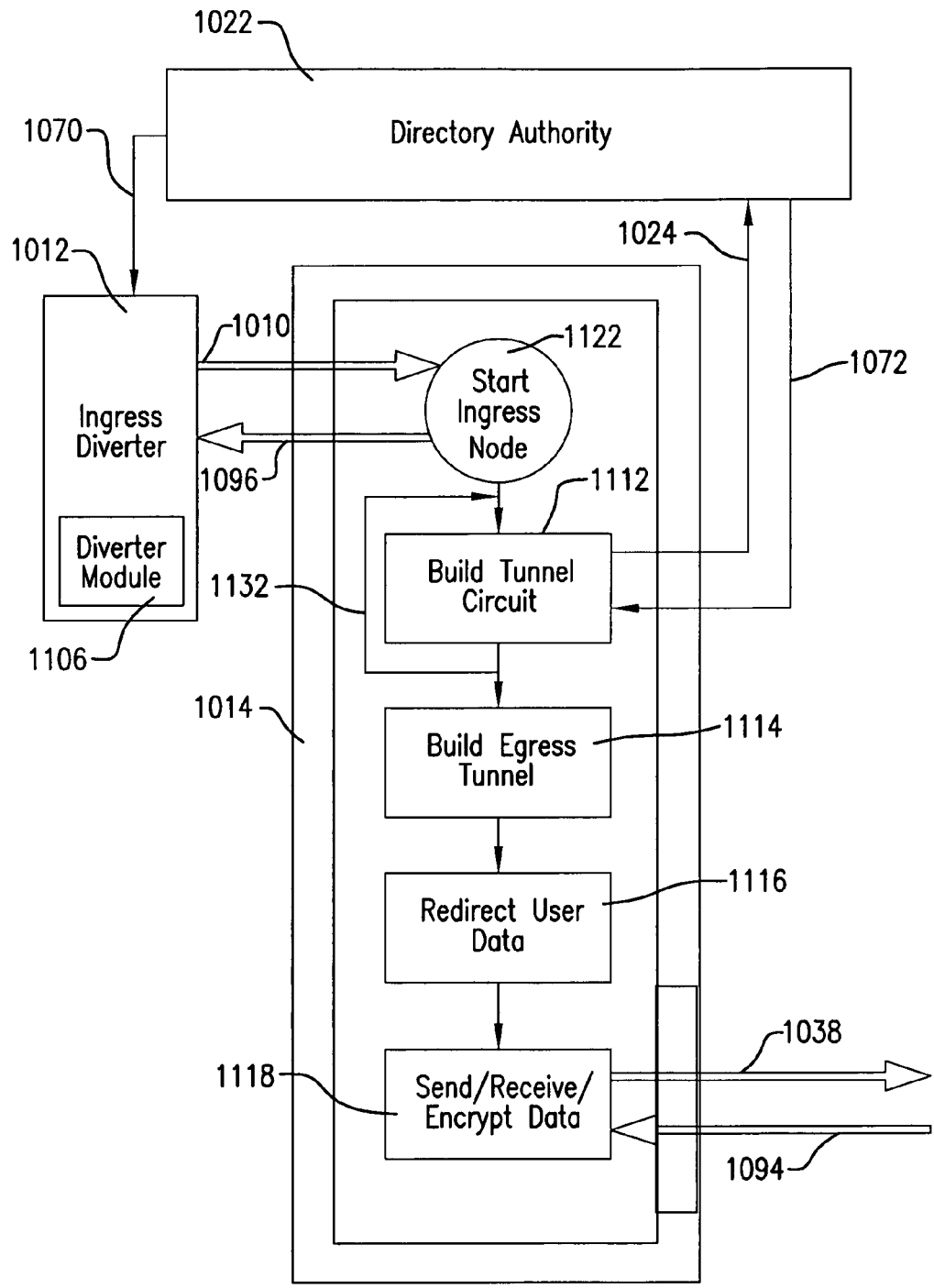
FIG. 11 is a schematic diagram illustrating the operation of a private ingress node of the secure geolocation obscurity network of FIG. 10.

As shown in FIG. 11, ingress diverter 1012 includes a diverter module 1106. Diverter module 1106 performs a mapping and forwarding operation as described below with reference to FIG. 24. These mapping and forwarding operations are carried out independently of whether or not a tunnel circuit is established as shown in FIG. 11 and described below. However, if the tunnel circuit is not completed, the call will not be able to be answered by the client.

Also, as shown in FIG. 11, private ingress node 1014 includes a tunnel circuit builder module 1112, an egress tunnel builder module 1114, an ingressing user data redirection module 1116 and a send/receive module 1118. Tunnel circuit module 1112, egress tunnel builder module 1114, ingressing user data redirection module 1116 and send/receive module 1118 may each comprise hardware and/or software.

Upon receiving the client communication from ingress diverter 1012, private ingress node 1014 is activated at step 1122. Tunnel circuit builder module 1112 builds a tunnel circuit, such as tunnel circuit 1034, based on information from directory authority node 1022. The tunnel circuit is the "outer tunnel" of the double tunnel SGLON 1002. Private ingress node 1014 introduces itself to directory authority node 1022 and queries directory authority node 1022, as indicated by arrow 1024. Based on the random route path listing of nodes for tunnel circuit 1034 created by directory authority 1022, directory authority 1022 provides cached descriptors that identify public-private transit node as a logically adjacent and valid transit node. Tunnel circuit 1034 is a random path ordering of some or all the valid transit nodes for SGLON 1002 that client communication traverses to get to an egress node, such as public-private egress node 1030. Tunnel circuit builder module 1112 also forms a connection between each transit node, shown by arrow 1040 in FIG. 10, to thereby form tunnel circuit 1034. In one embodiment of the present invention, ingress diverter 1012 receives the public keys of each transit node of the tunnel circuit. If the tunnel circuit cannot be built, ingress diverter 1012 and tunnel circuit builder module 1112 attempt to recreate the tunnel circuit again until successful, as indicated by arrow 1132.

Upon completion of collecting the public keys and building the tunnel circuit, control passes to egress tunnel builder module 1114. The egress tunnel builder module establishes a connection, shown by arrows 1010, 1038, 1040, 1042 and 1046, between ingress diverter 1012 and egress diverter 1032. Then send/receive module 1118 sends the encrypted traffic through tunnel circuit 1034 to public-private egress node 1030 where the traffic is decrypted.

Each of the modules of the private ingress node 1014 comprises hardware and/or software.

A user at the communication device may assign a maximum duration for the tunnel circuit, and/or the tunnel circuit may have a default maximum duration. For example, if the user assigns a maximum duration of one (1) hour to the tunnel circuit, when the tunnel circuit has been active for one (1) hour, the communication device and secure ingress mode will rebuild a new tunnel circuit using a new random route path listing. Before a new tunnel circuit is built, the user may be given the option to continue with the present tunnel circuit or to extend the maximum duration for the tunnel circuit.

Figure 12:
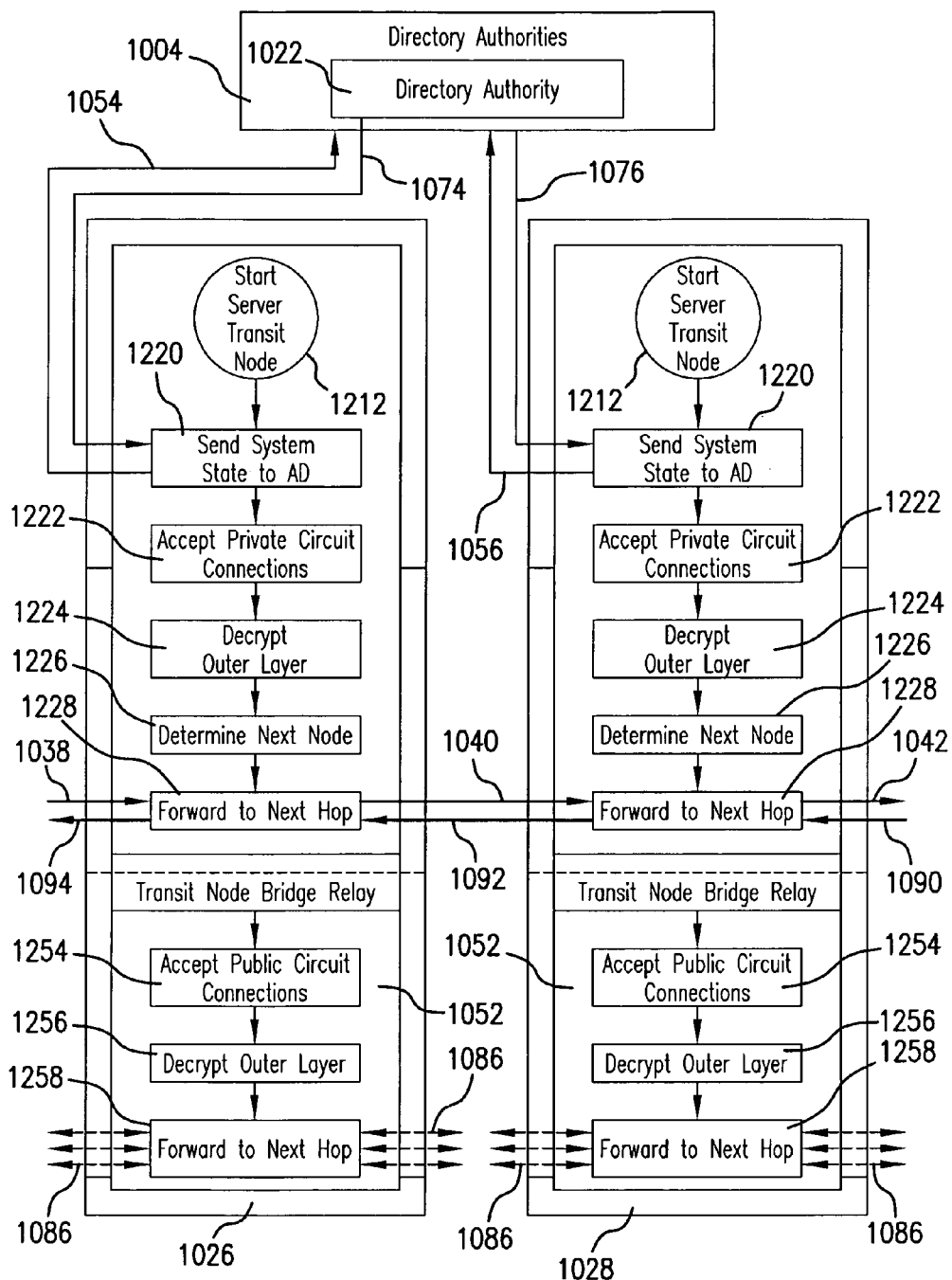
FIG. 12 is a schematic diagram illustrating the operation of two public-private transit nodes of the secure geolocation obscurity network of FIG. 10.

FIG. 12 shows logical data flow for transit nodes 1026 and 1028. When one of these transit nodes is activated at step 1212, a system state module 1220 of the transit node introduces the transit node to both public and private directory authorities, as indicated by arrows 1054 and 1056 for transit nodes 1026 and 1028, respectively. This introduction is necessary for each of the transit nodes to be able to receive obscurity protocol traffic. The information provided by system state module 1220 to the directory authorities 1004 during this process includes characteristics such as transit node name, system uptime, bandwidth availability and public key. Once determined to be a legitimate transit node by directory authorities 1004, transit nodes, such as transit nodes 1026 and 1028, will begin to be included in the circuit paths of both public and private circuits. Also, once determined to be a valid transit node, a circuit connection acceptance module 1222 of the valid transit node will begin accepting private connections. As tunnel circuit traffic arrives, a decryptor module 1224 decrypts the encrypted outer layer. If this decryption process is successful, the next node/next hop in the tunnel circuit is determined by next node determination module 1226. Forwarding module 1228 then forwards the packet to the next node/next hop, as indicated by arrow 1040 for the "next hop" from public-private transit node 1026 to transit node 1028 and as indicated by arrow 1042 for the "next hop" from public-private transit node 1028 to public-private egress node 1030.

As shown in FIG. 12, public-private transit nodes 1026 and 1028 also each include a transit node bridge relay 1252. Transit node bridge relay 1252 includes an accept public circuit connections module 1254, a data decryption module 1256 and a forwarding module 1258. Accept public circuit connections module 1254 accepts public circuits that pass through a portion of the transit node allocated to public traffic. Data decryption module 1256 decrypts the outer layer of the public traffic. Forwarding module 1258 then sends data to and receives data from the public circuits connected to the transit node (public-private transit node 1026 or 1028), as indicated by double-headed arrows 1086.

Circuit connections module 1254 includes a component that determines whether a connection is to be accepted or not. This component acts as a throttle if the portion of the node allocated to public traffic needs to be increased to accept more public circuits.

Each of the modules of the public-private transit nodes 1026 and 1028 comprises hardware and/or software.

Figure 13:
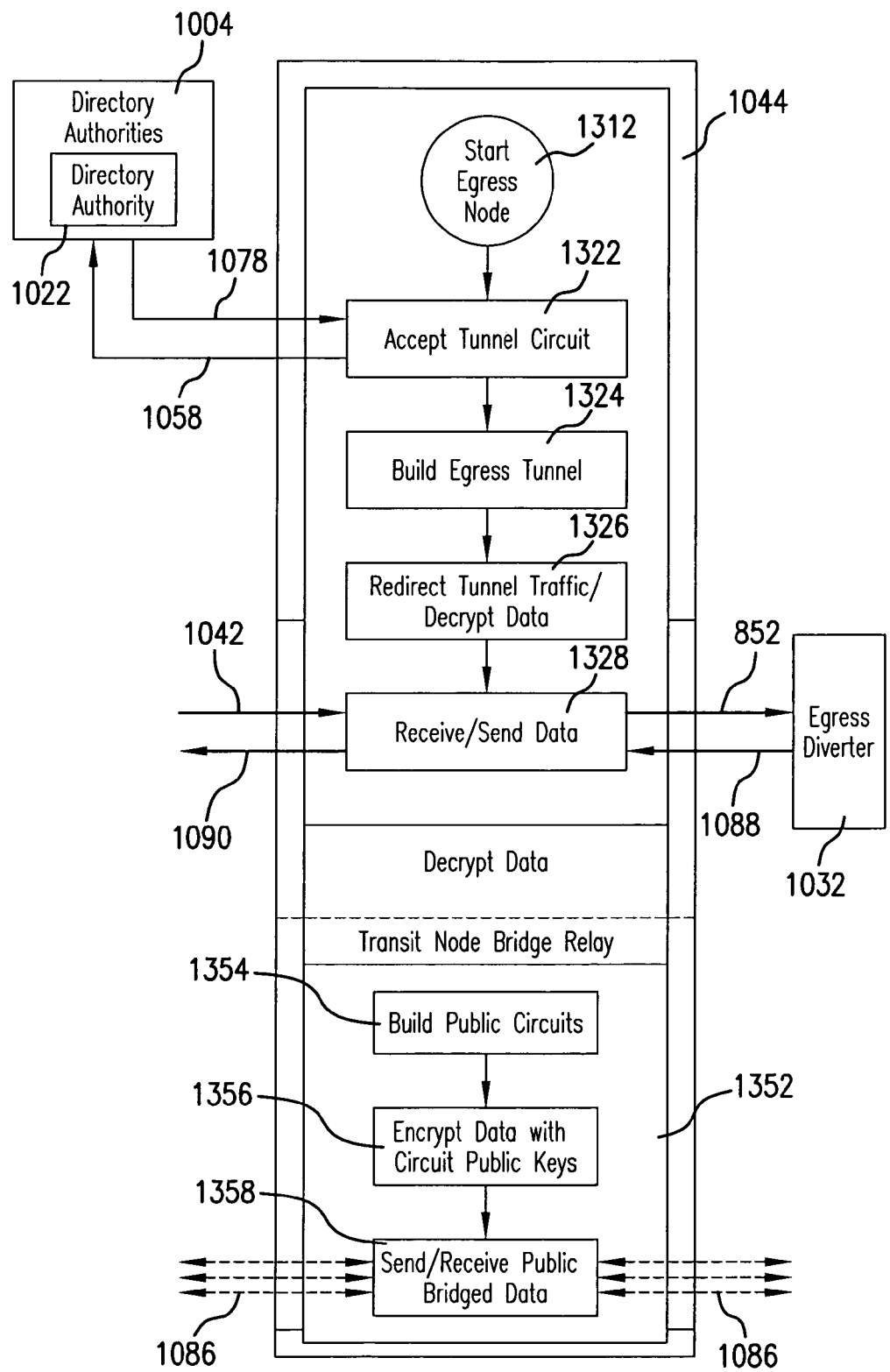
FIG. 13 is a schematic diagram illustrating the operation of a private egress node of the secure geolocation obscurity network of FIG. 10.

FIG. 13 shows logical data flow for public-private egress node 1030. When public-private egress node 1030 is activated at step 1312, a tunnel circuit screening module 1322 of public-private egress node 1030 introduces itself to directory authority node 1022 of directory authorities 1004 as indicated by arrow 1058. Arrow 1058 also shows public-private egress node 1030 querying directory authority node 1022 of directory authorities 1004 with a query for cached descriptors for the previous in-line logically adjacent valid transit node, transit node 1028 in FIG. 10, and for the server, egress diverter 1032 in FIG. 10, to which the current communication is to be sent. In response to this query, directory authority node 1022 provides the requested information as indicated by arrow 1078. Tunnel circuit screening module 1322 then checks the descriptors of the previous in line logically adjacent transit node for the potential incoming tunnel circuit against the cached descriptors for the previous in line logically adjacent transit node received from directory authority node 1022. If public-private egress node 1030 will allow the tunnel circuit (tunnel circuit 1034 in FIG. 10) to be built, tunnel circuit screening module 1322 will send the public key to private ingress node 1014 through tunnel circuit 1034. Control is then passed to an egress tunnel building module 1324 to begin building the egress tunnel. Egress tunnel building module 1324 also includes a decryption module that decrypts the encrypted traffic from the tunnel circuit to form decrypted traffic. The egress tunnel is the "inner tunnel" of the double tunnel SGLON 1002. Once the egress tunnel is built, egressing traffic redirection module 1326 redirects the decrypted traffic from the tunnel circuit to the egress tunnel. A send/receive module 1328 sends the decrypted traffic to egress diverter 1032 through the egress tunnel.

As shown in FIG. 13, public-private egress node 1030 also includes an egress node bridge relay 1352 that functions in the same way as transit node bridge relay 1342. Egress node bridge relay 1352 includes a public circuit building module 1354, a data encryption module 1256 and a send/receive module 1358. Public circuit building module 1354 builds public circuits that pass through a portion of public-private egress node 1030 allocated to public traffic. Data encryption module 1356 encrypts the public traffic/data that travels in the public circuit with circuit public keys. Send/receive module 1358 then sends and receives data to public circuits, shown by double-headed arrows 1086.

Each of the modules of the public-private egress node 1030 comprises hardware and/or software.

Figure 14:
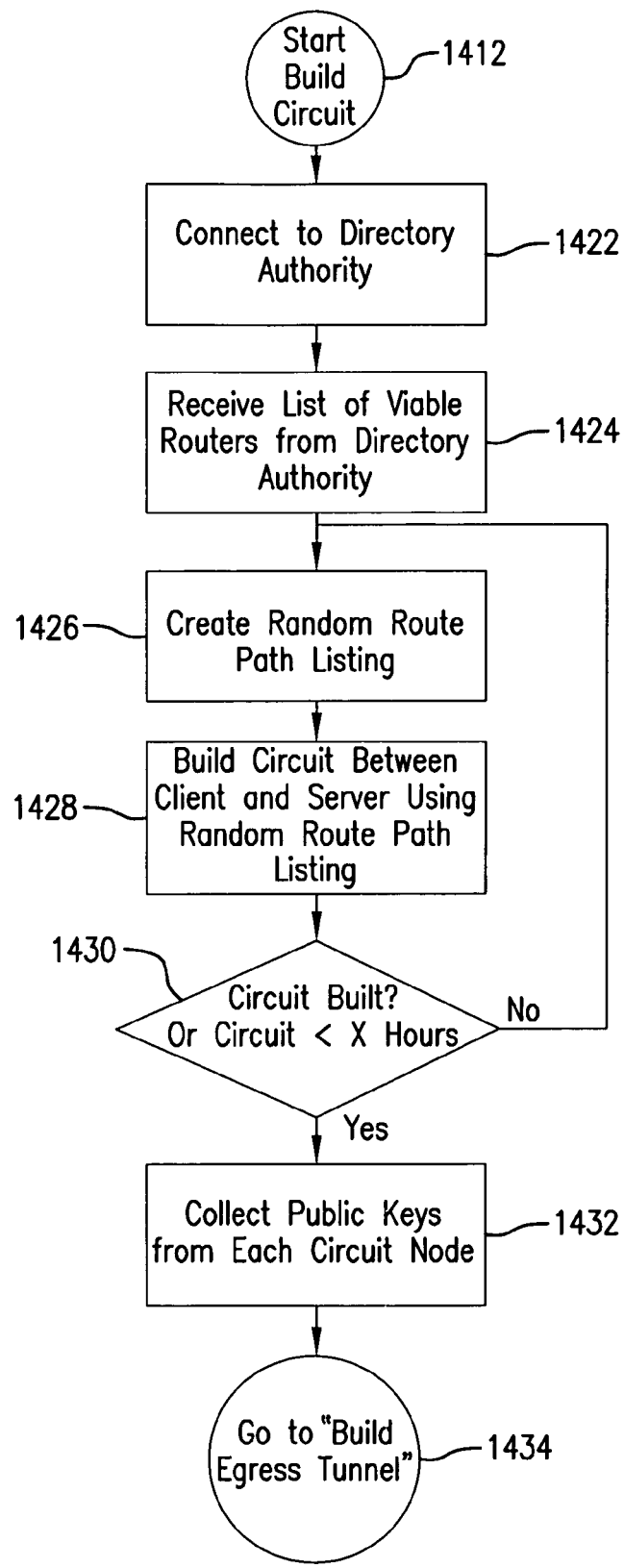
FIG. 14 is a flowchart illustrating the operation of a tunnel circuit builder module of the private ingress node of FIG. 11.

FIG. 14 shows the operation of tunnel circuit builder module 1112 of private ingress node 1014. After activating at step 1412, tunnel circuit builder module 1112 connects to directory authority node 1022 at step 1422. At step 1424, tunnel circuit builder module 1112 receives a random route path listing of valid/viable transit nodes/routers from directory authority node 1022. At step 1426, tunnel circuit builder module 1112 then creates a random route path listing using at least some of the valid/viable transit nodes by randomly picking which valid transit nodes to hop through based on a random number generator that is part of the operating system for directory authority node 1022. The random route path listing will be used to build a tunnel circuit, such as tunnel circuit 1034, which is a random path of hops from public-private transit node to public-private transit node through each of the selected public-private transit nodes that will connect private ingress node 1014 to public-private egress node 1030.

Based on the random route path listing, directory authority node 1022 provides cached descriptors to public-private egress node 1030, as shown by arrow 1078, that allow public-private egress node 1030 to confirm that public-private transit node 1028, the previous in line logically adjacent transit node to public-private egress node 1030, is valid. At step 1428, tunnel circuit builder module 1112 builds a tunnel circuit between ingress diverter 1012 and egress diverter 1032 based on the random route path listing. The tunnel circuit is built by each node in the tunnel circuit confirming that the previous in line and next in line logically adjacent nodes to that node are valid. In this way the tunnel circuit is "anonymous" because the information about the entire random route path listing cannot be obtained from directory authority node 1022 or from any of the nodes that are part of the random route path listing. Directory authority node 1022 does not store the random route path listing, and the nodes that are part of the random route path listing have information about only one or two logically adjacent nodes in the random route path listing.

If, for any reason, the tunnel circuit cannot be built, at step 1430 the tunnel building process returns to step 1426 so the tunnel circuit builder module 1112 can create a new random route path listing. Also, if the tunnel circuit has existed beyond its maximum allowed duration (the tunnel circuit has existed for X or more hours), at step 1430 the tunnel building process returns to step 1426 so the tunnel circuit can create a new random route path listing. If the tunnel circuit can be built at step 1430, control is passed to step 1432. Also, for an existing tunnel circuit, if the maximum duration of the tunnel circuit has not been reached (X is less than X hours), control is passed to step 1432. At step 1432, tunnel circuit builder module 1112 collects the public keys from each transit node in the tunnel circuit and transfers the public keys to the private ingress node where they are stored on one or more storage media. Control is then passed to egress tunnel builder module 1114 at step 1434.

Figure 15:
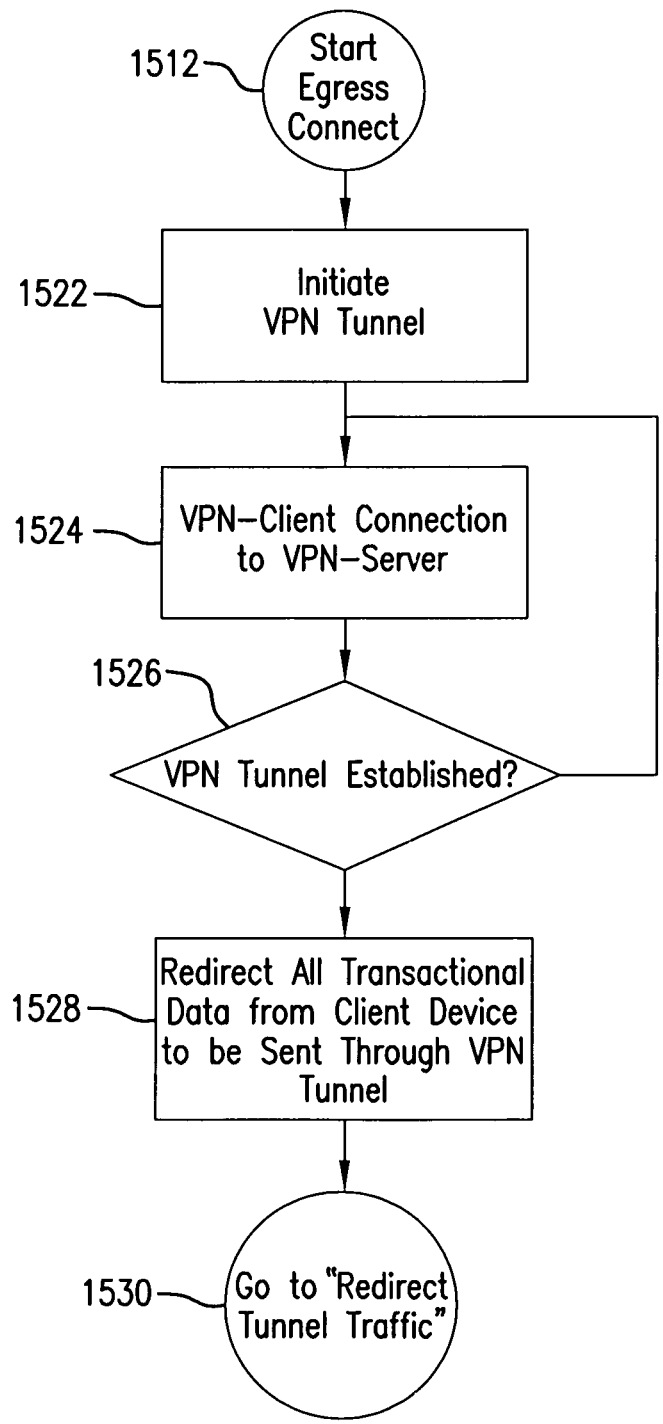
FIG. 15 is a flowchart illustrating the operation of an egress tunnel builder module of the private ingress node of FIG. 11.

FIG. 15 shows the operation of egress tunnel builder module 1114 of private ingress node 1014. After activating at step 1512, at step 1522 egress tunnel builder module 1114 initiates an egress tunnel (VPN tunnel). At step 1524, egress tunnel builder module 1114 establishes an egress tunnel between ingress diverter 1012 and egress diverter 1032. At step 1526, if the egress tunnel is not established, control is returned to step 1524, where egress tunnel builder module 1114 attempts to once again establish an egress tunnel between ingress diverter 1012 and egress diverter 1032. Once the egress tunnel is established at step 1526, secure traffic/data from ingress diverter 1012 to be sent to the egress tunnel (VPN tunnel) is redirected/rerouted at step 1528. Control is then passed to ingressing user data redirection module 1116 at step 1530.

Figure 16:
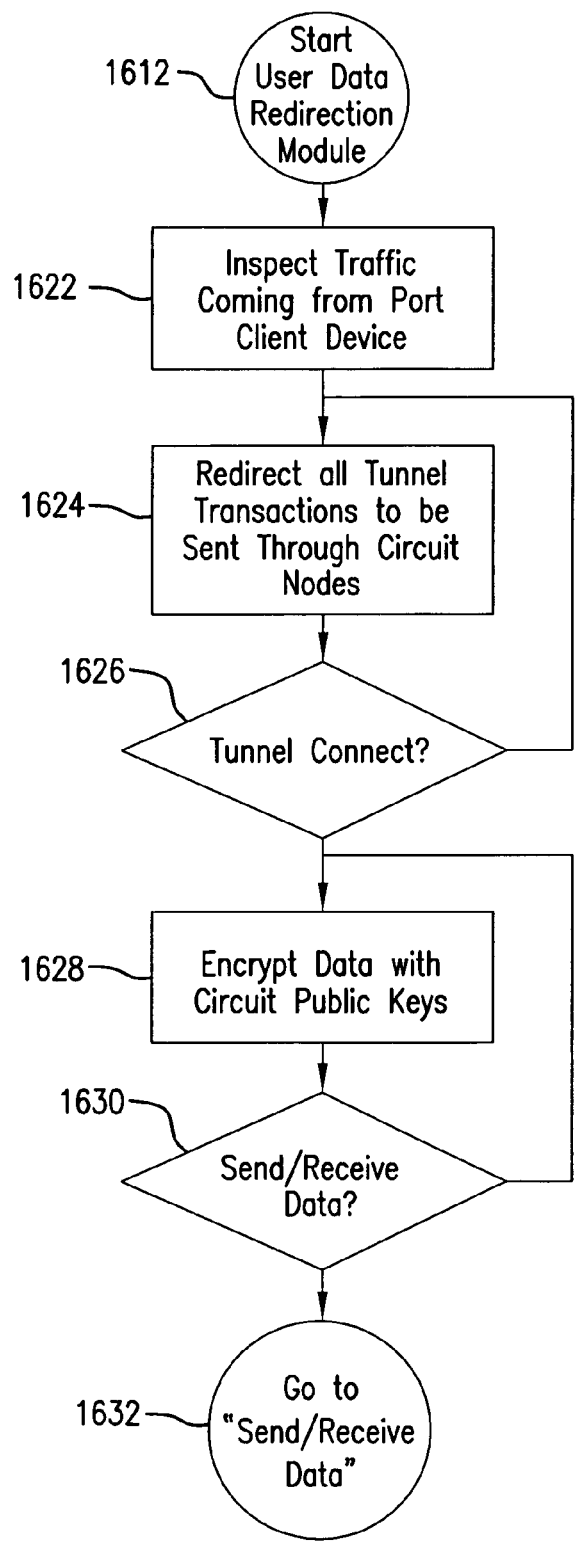
FIG. 16 is a flowchart illustrating the operation of an ingressing traffic redirection module of the private ingress node of FIG. 11.

FIG. 16 shows the operation of ingressing user data redirection module 1116 of private ingress node 1014. After activating at step 1612, user data redirection module 1116 inspects incoming traffic/data from ingress diverter 1012 at step 1622. At step 1624, user data redirection module 1116 redirects the traffic/data so that the traffic/data are sent through the tunnel circuit built by tunnel circuit builder module 1112. If connection to the tunnel circuit cannot be established by ingressing user data redirection module 1116 at step 1626, control is returned to step 1624 and ingressing user data redirection module 1116 attempts to reconnect to the tunnel circuit. Once a connection to the tunnel circuit is established at step 1626, the traffic is encrypted by ingressing user data redirection module 1116 using the public keys from the transit nodes collected by tunnel circuit builder module 1112 at step 1628. If tunnel circuit module 1112 determines at step 1630 that there is still additional traffic to encrypt, control is returned to step 1628 until all of the traffic is encrypted. Once all of the traffic is encrypted, control is passed to send/receive module 1118 at step 1632.

FIG. 17 shows the operation of system state module 1220 of public-private transit nodes 1026 and 1028. After activating at step 1712, system state module 1220 determines the directory authority with which the transit node will communicate at step 1722. System state module 1220 then connects to a directory authority, such as directory authority 1022, at step 1724. System state module 1220 then sends a list of description attributes to the directory authority at step 1726. The information provided by system state module 1220 to the directory authority during this process includes characteristics such as transit node name, system uptime, bandwidth availability and public key. After providing this information to the directory authority, control passes to circuit connection acceptance module 1222 at step 1728.

FIG. 18 shows the operation of circuit connection acceptance module 1222 of public-private transit nodes 1026 and 1028. After activating at step 1812, circuit connection acceptance module 1222 "listens," i.e., keeps a port of the transit node (public-private transit node 1026 or 1028) open for tunnel circuit service requests at step 1822. Upon receiving a tunnel circuit service request at step 1824, control passes to decryptor module 1224 at step 1824.

Figures 19, 20:
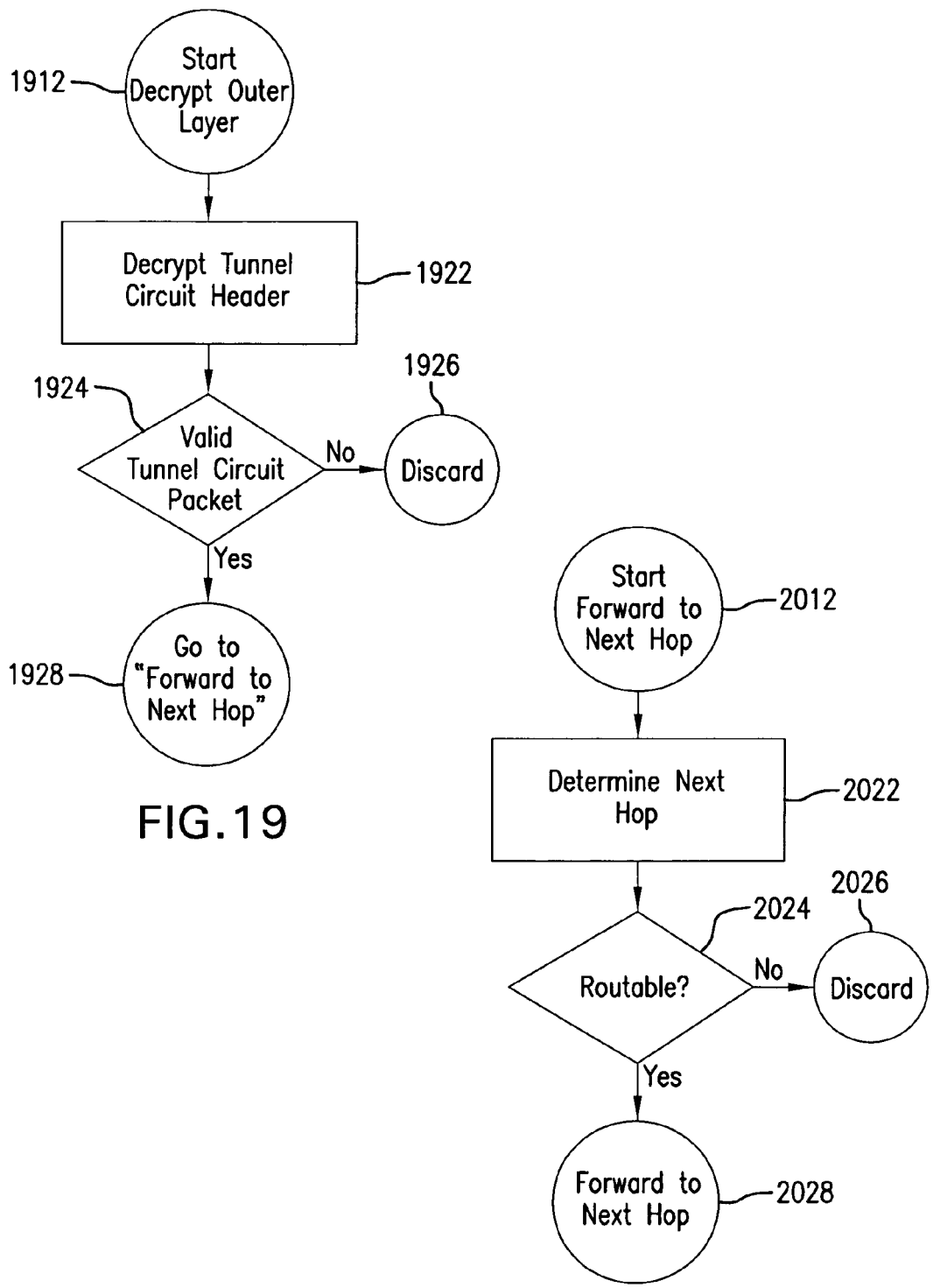
FIG. 19 is a flowchart illustrating the operation of a private circuit builder module of one of the public-private transit nodes of FIG. 12.
FIG. 20 is a flowchart illustrating the operation of a next node module and forwarding module of one of the public-private transit nodes of FIG. 12.

FIG. 19 shows the operation of decryptor module 1224 of public-private transit nodes 1026 and 1028. After activating at step 1912, decryptor module 1224 decrypts the tunnel circuit header for an incoming tunnel circuit packet (incoming traffic from the tunnel circuit) at step 1922. Decryptor module 1224 then determines if the tunnel circuit packet is valid at step 1924. If the tunnel circuit packet is not valid, the tunnel circuit packet is discarded at step 1926. If the tunnel circuit packet is valid, control passes to next node module 1226 at step 1926.

FIG. 20 shows the operation of next node module 1226 and forwarding module 1228 of public-private transit nodes 1026 and 1028. After activating at step 2012, next node module 1226 determines the next node/next hop for the tunnel circuit at step 2022. Next node module 1226 then determines if the next hop is routable at step 2024. If the next hop is not routable, the tunnel circuit packet is discarded at step 2026. If the tunnel circuit packet is routable, the tunnel circuit packet is forwarded to the next hop at step 2026 by forwarding module 1228. The next hop may be to either another transit node or to the egress node for the tunnel circuit. For example, in FIG. 10, the next hop for transit node 1026 is transit node 1028 and the next hop for transit node 1028 is egress node 1030.

Figure 21:
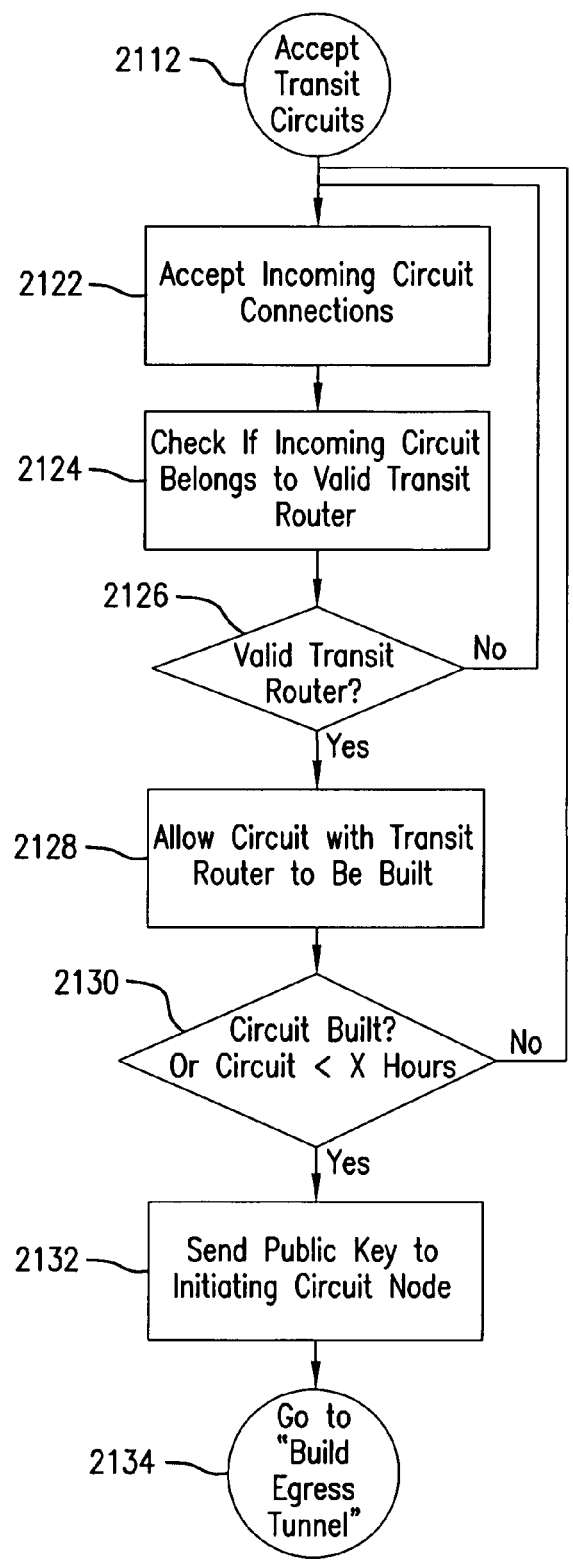
FIG. 21 is a flowchart illustrating the operation of a tunnel circuit screening module of the private egress node of FIG. 13.

FIG. 21 shows the operation of tunnel circuit screening module 1322 of public-private egress node 1030. After activating at step 2112, tunnel circuit screening module 1322 of public-private egress node 1030 accepts incoming circuit connections at step 2122. Tunnel circuit screening module 1322 then checks an incoming tunnel circuit that includes only valid nodes at step 2124. If one or more of the transit nodes in the incoming tunnel circuit is determined by tunnel circuit screening module 1322 not to be valid at step 2126, control is returned to step 2122. Also, if the tunnel circuit has existed beyond its maximum allowed duration (the tunnel circuit has existed for X or more hours) at step 2126, control is returned to step 2122. If all of the transit nodes in the tunnel circuit are determined by tunnel circuit screening module 1322 to be valid at step 2126, the tunnel circuit screening module 1322 allows the tunnel circuit to be built and control is passed to step 2128. Also, for an existing tunnel circuit, if the maximum duration of the tunnel circuit has not been reached (X is less than X hours), control is passed to step 2128. The maximum duration, X hours, may be set using a configuration file. At step 2128, tunnel circuit screening module 1322 sends the public key to private ingress node 1014 (the initiating circuit node). Control is then passed to egress tunnel building module 1324 at step 1434.

Figure 22:
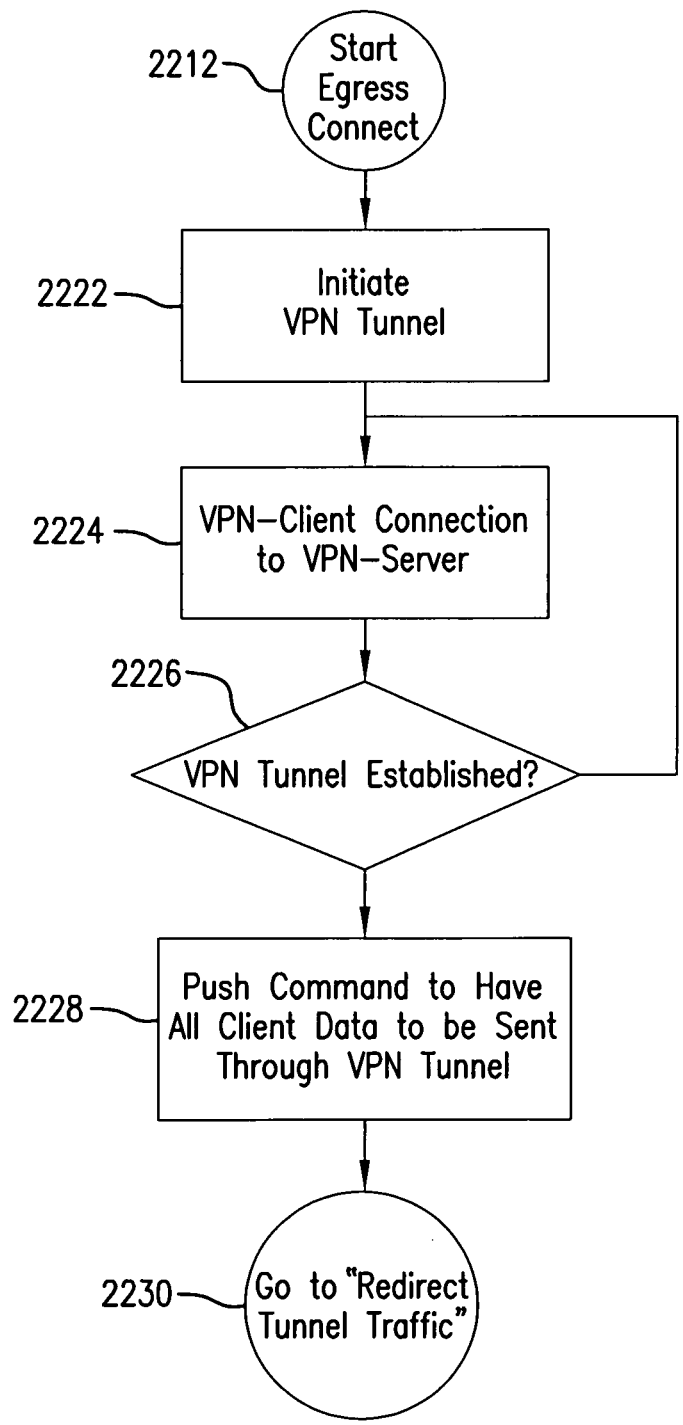
FIG. 22 is a flowchart illustrating the operation of an egress tunnel building module of the private egress node of FIG. 13.

FIG. 22 shows the operation of egress tunnel building module 1324 of public-private egress node 1030. After activating at step 2212, egress tunnel building module 1324 of public-private egress node 1030 initiates the build process for the VPN tunnel (egress tunnel) at step 2222. Egress tunnel building module 1324 attempts to receive incoming client requests at step 2224. If the egress tunnel connection is determined to be unsuccessful by egress tunnel building module 1324 at step 2226, control returns to step 2222. If the egress tunnel connection is determined to be successful by egress tunnel building module 1324 at step 2226, then at step 2228 egress tunnel building module 1324 pushes instructions on how to redirect the traffic to egress diverter 1032 back to ingress diverter 1012 through tunnel circuit 1034. Control then passes to egressing traffic redirection module 1326 at step 2230.

Figure 23:
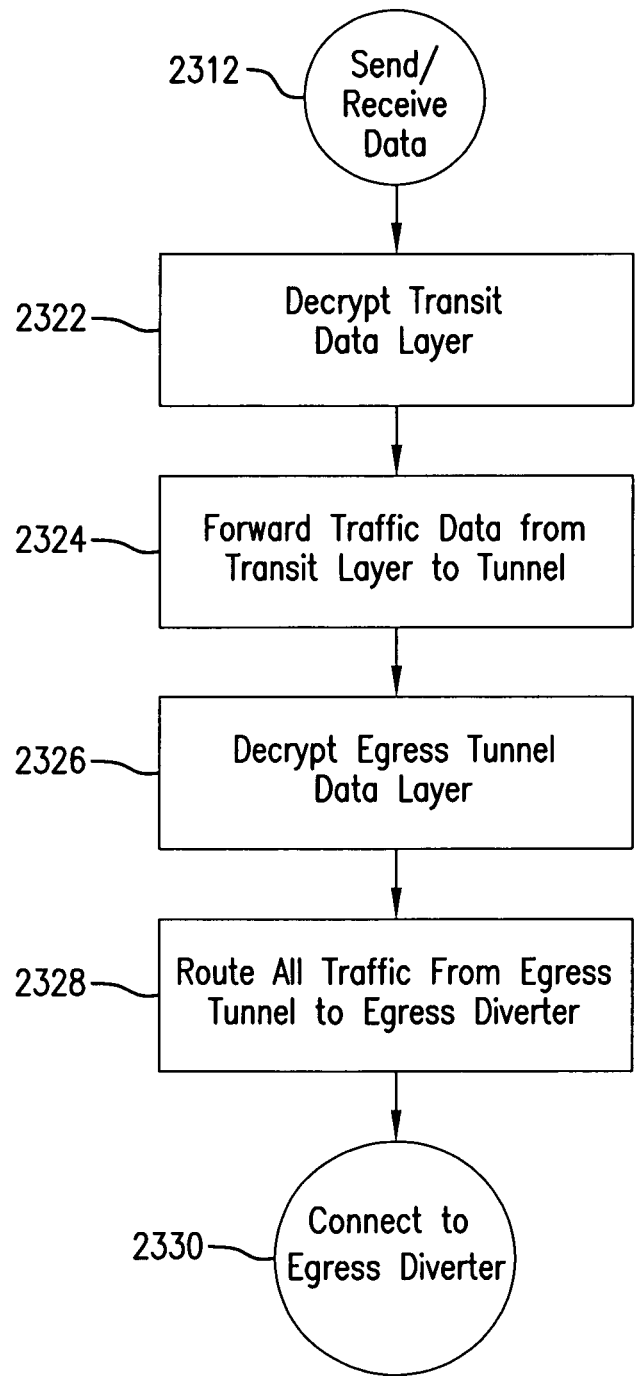
FIG. 23 is a flowchart illustrating the operation of an egressing traffic redirection module and a send/receive module of the private egress node of FIG. 13.

FIG. 23 shows the operation of egressing traffic redirection module 1326 and send/receive module 1328 of public-private egress node 1030. After activating at step 2312, egressing traffic redirection module 1326 of public-private egress node 1030 decrypts the transit circuit layer (outer tunnel) at step 2322. After decrypting the transit circuit layer, egressing traffic redirection module 1326 forwards transit circuit packets (traffic) to the egress tunnel at step 2324. Egressing traffic redirection module 1326 then decrypts the packets (inner tunnel) at step 2326. Egressing traffic redirection module 1326 then routes the traffic from the egress tunnel to send/receive module 1328 at step 2328. Send/receive module 1328 then communicates with the third-party communications systems at step 2330.

Figure 24:
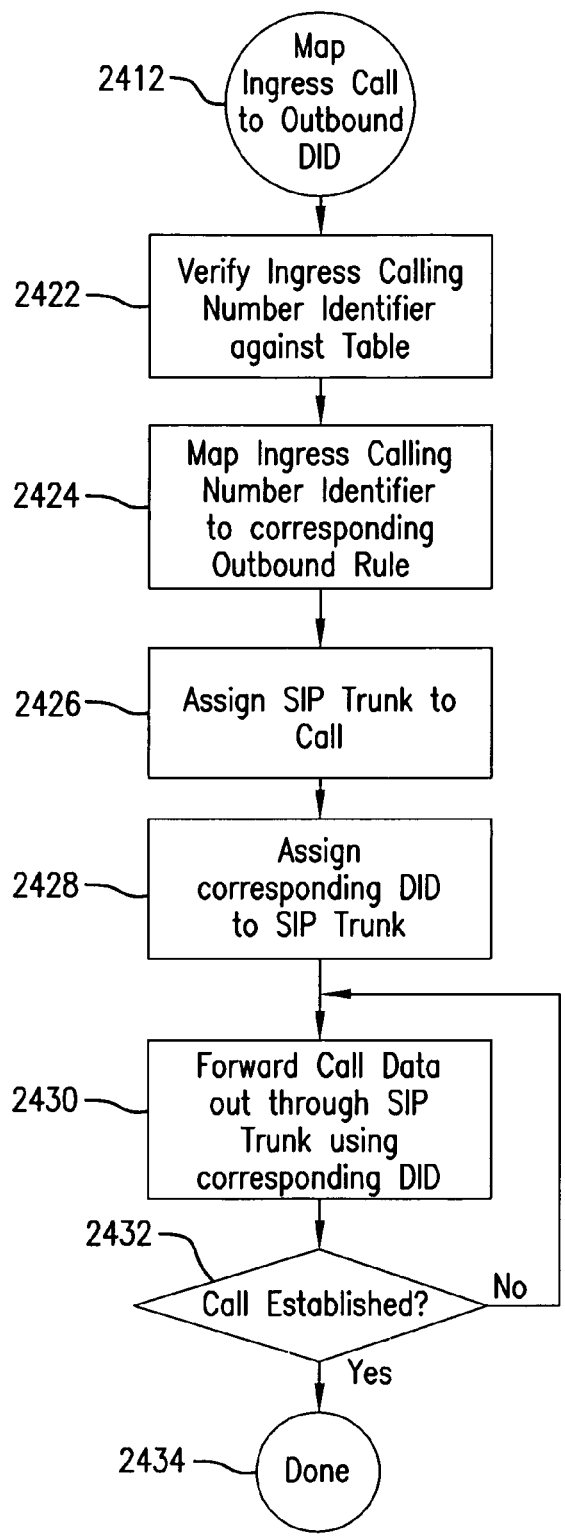
FIG. 24 is a flowchart illustrating the operation of a diverter module of ingress diverter of FIG. 13.

FIG. 24 shows the operation of a diverter module 1106 of ingress diverter 1012. At step 2412 diverter module 1106 activates to map an ingress communication, such as a call, to an outbound direct inward dialing number (DID). At step 2422 diverter module 1106 verifies ingress calling number identifiers, i.e., originating telephone numbers, from a table stored in a data storage device that is part of ingress diverter 1012 or that is in communication with ingress diverter 1012. At step 2424 diverter module 1106 maps an ingress calling number identifier, i.e., a Caller ID, to a corresponding outbound rule. An outbound rule is predefined set of decisions and logic to determine the path of a particular call. At step 2426 diverter module 1106 assigns a session initiation protocol (SIP) trunk to the communication. At step 2428 diverter module 1106 assigns the corresponding DID to the SIP trunk assigned to the communication in step 2426. The corresponding DID is the egress phone number assigned to the call. At step 2430 diverter module 1106 forwards the communication out through the SIP trunk using the corresponding DID. At step 2432, diverter module determines if the communication is complete. If at step 2432 diverter module 1106 determines that the communication is not complete, step 2430 is repeated. At step 2432, the diverter module determines if the call is established. If the call is established, the mapping and forwarding is complete.

Figure 25:
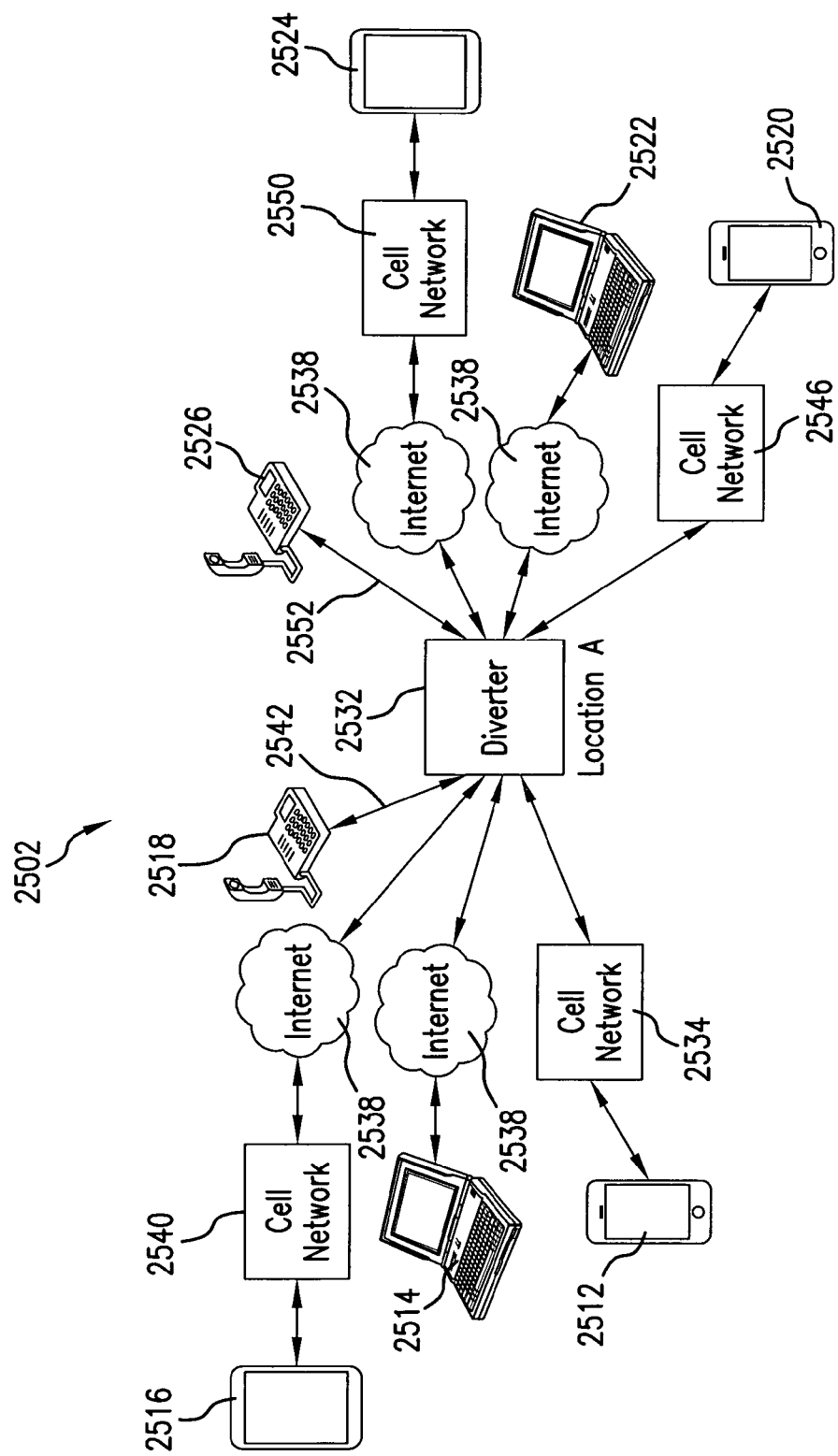
FIG. 25 is a schematic diagram of a secure geolocation obscurity network in accordance with one embodiment of the present invention.

FIG. 25 shows a secure geolocation obscurity network (SGLON) 2502 according to one embodiment of the present invention. FIG. 25 shows eight communication devices: smartphone 2512, laptop computer 2514, tablet computer 2516, telephone 2518, smartphone 2520, laptop computer 2522, tablet computer 2524 and telephone 2526. Although any of these eight communication devices may be client devices or destination devices, for simplicity of illustration in the description below, smartphone 2512, laptop computer 2514, tablet computer 2516 and telephone 2518 will be treated as being client devices whose location is being obscured from the other four communication devices, i.e., smartphone 2520, laptop computer 2522, tablet computer 2524 and telephone 2526, which will be treated as being destination devices. Smartphone 2512 connects to a diverter 2532 of SGLON 2502 via a cell network 2534. Laptop computer 2514 connects to diverter 2532 via the Internet 2538. Tablet computer 2516 connects to diverter 2532 via a cell network 2540 and the Internet 2538. Telephone 2518 connects to diverter 2532 via a landline 2542. Smartphone 2520 connects to diverter 2532 via a cell network 2546. Laptop computer 2522 connects to diverter 2532 via the Internet 2538. Tablet computer 2524 connects diverter 2532 of SGLON 2502 via a cell network 2550 and the Internet 2538. Telephone 2526 connects to diverter 2532 via a landline 2552. Diverter 2532 is located at location A.

In FIG. 25, smartphone 2512, laptop computer 2514, tablet computer 2516 and telephone 2518 have an area code for location A, the location of diverter 2532. In one embodiment of the present invention, when a user using any of these client devices sends a communication, a menu is provided on a visual display device of the client device that allows a user to choose a telephone number having the same area code as location A that will be the apparent originating telephone number when the communication is received by the destination device, i.e., smartphone 2512, laptop computer 2514, tablet computer 2516 or telephone 2518, chosen by the user to receive the communication. In one embodiment of the present invention, the apparent originating telephone number may be randomly determined by diverter 2532.

Although only a few modes communication are shown in FIG. 25 for simplicity of illustration, the embodiment of the present invention illustrated in FIG. 25 may involve various modes of communication. For example, a communication device, either the client device or the destination device, may be in communication with the SGLON via an analog line, an SIP call, or a voice-over-Internet protocol (VOIP).

While the present invention has been disclosed with reference to certain embodiments, numerous modifications, alterations and changes to the described embodiments are possible without departing from the spirit and scope of the present invention, as defined in the appended claims. Accordingly, it is intended that the present invention not be limited to the described embodiments, but that it have the full scope defined by the language of the following claims, and equivalents thereof.

What is claimed is:

1. A device comprising:
a first diverter for mapping a communication from the first diverter at a first location to a second diverter at a second location, and for causing the communication to appear as originating from a client device at the second location when the communication is received by a destination device,
wherein the second location is different from the first location.

2. The device of claim 1, wherein the first diverter comprises:
a private portion comprising a private pathway through the first diverter for receiving and transmitting high bandwidth secure private traffic by the first diverter, and
a public portion comprising a plurality of public pathways through the first diverter for transmitting low bandwidth secure public traffic by the first diverter,
wherein the first diverter is configured for receiving and transmitting private and public traffic by the first diverter.

3. The device of claim 1, wherein the first diverter is configured for controlling the size of a public portion of the first diverter.

4. The device of claim 1, wherein the first diverter is configured for carrying out the functions of an ingress node.

5. The device of claim 4, wherein the first diverter is configured: for building a tunnel circuit from an ingress node to an egress node, for redirecting traffic from a client device to the tunnel circuit, for encrypting the traffic to form encrypted traffic, and for sending traffic to and receiving traffic from the tunnel circuit,
wherein the tunnel circuit comprises a random route path through a plurality of randomly selected public-private transit nodes.

6. The device of claim 1, wherein the first diverter is configured for carrying out the functions of an egress node.

7. The device of claim 6, wherein the first diverter is configured: for building an egress tunnel from a client device to a destination device, for redirecting encrypted traffic from a tunnel circuit to the egress tunnel and for decrypting the encrypted traffic from the tunnel circuit to thereby form decrypted traffic, and for sending the decrypted traffic from the client device to the destination device through the egress tunnel.

8. The device of claim 1, wherein the first location is a first area code and wherein the second location is a second area code that is different from the first area code.

9. A device comprising a first diverter node configured to implement a method comprising the following steps:
- (a) mapping a communication from the first diverter node at a first location to a second diverter node at a second location, and
- (b) causing the communication to appear as originating from a client device at the second location when the communication is received by a destination device, wherein the second location is different from the first location.

10. The device of claim 9, wherein an apparent originating location is displayed on a visual display device that is part of a destination device or in communication with the destination device when the communication is received by the destination device.

11. The device of claim 9, wherein an apparent originating telephone number is displayed on a visual display device that is part of a destination device or in communication with the destination device when the communication is received by the destination device.

12. The device of claim 9, wherein the method comprises the following steps:
- (c) receiving a list of valid apparent originating telephone numbers from a data storage device,
- (d) mapping a selected apparent originating telephone number to a corresponding outbound rule,
- (e) assigning a session ignition protocol (SIP) trunk to the communication,
- (f) assigning a corresponding direct inward dialing number (DID) to the SIP trunk, and
- (g) forwarding the communication through the SIP trunk using the corresponding DID.

13. The device of claim 12, wherein the method comprises the following steps:
- (h) determining that the communication has been received by the destination device.

* * * * *